(12) United States Patent
Kimura et al.

(10) Patent No.: US 8,599,513 B1
(45) Date of Patent: Dec. 3, 2013

(54) BEARING MECHANISM, MOTOR, AND DISK DRIVE APPARATUS

(71) Applicant: Nidec Corporation, Kyoto (JP)

(72) Inventors: Akihiro Kimura, Kyoto (JP); Akinobu Sumiji, Kyoto (JP); Kunio Sakurada, Kyoto (JP); Daisuke Fukuoka, Kyoto (JP); Akihisa Moriguchi, Kyoto (JP)

(73) Assignee: Nidec Corporation, Kyoto (JP)

( * ) Notice: Subject to any disclaimer, the term of this patent is extended or adjusted under 35 U.S.C. 154(b) by 0 days.

(21) Appl. No.: 13/775,475

(22) Filed: Feb. 25, 2013

(30) Foreign Application Priority Data

May 30, 2012 (JP) .................................. 2012-123007
Jan. 17, 2013 (JP) .................................. 2013-005903

(51) Int. Cl.
*G11B 19/20* (2006.01)

(52) U.S. Cl.
USPC ..................................................... 360/97.11

(58) Field of Classification Search
USPC ..................................................... 360/97.11
See application file for complete search history.

(56) References Cited

U.S. PATENT DOCUMENTS

| | | | |
|---|---|---|---|
| 5,533,811 A | 7/1996 | Polch et al. | |
| 5,558,443 A | 9/1996 | Zang | |
| 6,211,592 B1 | 4/2001 | Ichiyama | |
| 6,246,136 B1 | 6/2001 | Ichiyama | |
| 6,980,394 B2 * | 12/2005 | Inoue et al. | 360/99.08 |
| 7,514,831 B2 * | 4/2009 | Tamaoka | 310/90 |
| 7,593,182 B2 * | 9/2009 | Tamaoka et al. | 360/99.08 |
| 8,164,850 B2 * | 4/2012 | Gomyo et al. | 360/98.07 |
| 8,379,345 B2 * | 2/2013 | Mizukami et al. | 360/99.08 |
| 2004/0090702 A1 | 5/2004 | Aiello et al. | |
| 2004/0096131 A1 | 5/2004 | Aiello et al. | |
| 2004/0156568 A1 | 8/2004 | Woldemar et al. | |
| 2004/0165797 A1 | 8/2004 | Oku et al. | |
| 2004/0175062 A1 | 9/2004 | Nishimura et al. | |
| 2005/0031237 A1 | 2/2005 | Gomyo et al. | |
| 2005/0111769 A1 | 5/2005 | Haga | |

(Continued)

FOREIGN PATENT DOCUMENTS

| | | |
|---|---|---|
| JP | 06-28335 U | 4/1994 |
| JP | 06-121484 A | 4/1994 |

(Continued)

OTHER PUBLICATIONS

Kimura et al , "Dynamic Pressure Bearing and Spindle Motor Using the Same", U.S. Appl. No. 12/952,223, filed Nov. 23, 2010.

(Continued)

*Primary Examiner* — Mark Blouin
(74) *Attorney, Agent, or Firm* — Keating & Bennett, LLP

(57) ABSTRACT

A bearing mechanism includes a shaft portion, a sleeve portion, and an opposing portion including a surface arranged opposite to an end surface of the sleeve portion on one of upper and lower sides with a thrust gap defined therebetween. The thrust gap includes a thrust dynamic pressure bearing portion defined therein. The sleeve portion includes a sleeve body and a thrust plate fixed to an end portion of the sleeve body on the one of the upper and lower sides. The sleeve body includes an annular surface arranged opposite to the thrust plate, and an annular body projecting portion arranged to project in an axial direction inside of the annular surface. An outer circumferential surface of the body projecting portion and an inner circumferential surface of the thrust plate are arranged to be in direct or indirect contact with each other.

20 Claims, 31 Drawing Sheets

(56) References Cited

U.S. PATENT DOCUMENTS

| | | |
|---|---|---|
| 2005/0225187 A1 | 10/2005 | Hafen et al. |
| 2006/0002638 A1 | 1/2006 | Ichiyama |
| 2006/0002641 A1 | 1/2006 | Ichiyama |
| 2006/0039634 A1 | 2/2006 | Ichiyama |
| 2006/0039636 A1 | 2/2006 | Ichiyama |
| 2006/0051001 A1 | 3/2006 | Nishimura et al. |
| 2006/0210205 A1 | 9/2006 | Engesser et al. |
| 2006/0222276 A1 | 10/2006 | Uenosono |
| 2007/0140606 A1 | 6/2007 | Feng et al. |
| 2007/0154123 A1 | 7/2007 | Gomyo et al. |
| 2007/0177832 A1 | 8/2007 | Gotoh et al. |
| 2007/0211971 A1 | 9/2007 | Obara et al. |
| 2008/0006332 A1 | 1/2008 | Ishizawa et al. |
| 2008/0056104 A1 | 3/2008 | Nishimura et al. |
| 2009/0129710 A1 | 5/2009 | Ito et al. |
| 2009/0140587 A1 | 6/2009 | Popov et al. |
| 2009/0140588 A1 | 6/2009 | Drautz et al. |
| 2009/0279818 A1 | 11/2009 | Le et al. |
| 2010/0321823 A1 | 12/2010 | Oe et al. |

FOREIGN PATENT DOCUMENTS

| | | |
|---|---|---|
| JP | 07-336924 A | 12/1995 |
| JP | 2002-005171 A | 1/2002 |
| JP | 2003-092867 A | 3/2003 |
| JP | 2003-244886 A | 8/2003 |
| JP | 2004-173377 A | 6/2004 |
| JP | 2005-048890 A | 2/2005 |
| JP | 2006-226388 A | 8/2006 |
| JP | 2009-041671 A | 2/2009 |
| JP | 2009-133361 A | 6/2009 |
| WO | 2006/120719 A1 | 11/2006 |

OTHER PUBLICATIONS

Kimura et al., "Bearing Apparatus, Spindle Motor, and Disk Drive Apparatus", U.S. Appl. No. 12/791,147, filed Jun. 1, 2010.
OE et al., "Bearing Apparatus, Spindle Motor, and Disk Drive Apparatus", U.S. Appl. No. 12/793,851, filed Jun. 4, 2010.
Yamada et al., "Fluid Dynamic Bearing Apparatus Arranged to Discharge Air Bubbles Generated Therein and a Spindle Motor and Disk Drive Apparatus Including the Same", U.S. Appl. No. 12/742,931, filed May 14, 2010.
Yamada et al., "Fluid Dynamic Bearing Apparatus, Spindle Motor, and Disk Drive Apparatus", U.S. Appl. No. 12/899,658, filed Oct. 7, 2010.
Yamada et al., "Fluid Dynamic Bearing Apparatus, Spindle Motor, and Disk Drive Apparatus", U.S. Appl. No. 13/299,542, filed Nov. 18, 2011.
Kimura et al., "Bearing Apparatus, Spindle Motor, and Disk Drive Apparatus", U.S. Appl. No. 13/602,420, filed Sep. 4, 2012.
Kimura et al., "Bearing Apparatus, Spindle Motor, and Disk Drive Apparatus", U.S. Appl. No. 13/681,500, filed Nov. 20, 2012.
Iwasaki et al., "Motor and Disk Drive Apparatus", U.S. Appl. No. 13/613,109, filed Sep. 13, 2012.
Tamaoka et al., "Motor and Disk Drive Apparatus", U.S. Appl. No. 13/613,106, filed Sep. 13, 2012.
Iwasaki et al., "Motor and Disk Drive Apparatus", U.S. Appl. No. 13/613,108, filed Sep. 13, 2012.
Fukushima et al., "Motor and Disk Drive Apparatus", U.S. Appl. No. 13/751,380, filed Jan. 28, 2013.
Sekii et al., "Spindle Motor and Disk Drive Apparatus", U.S. Appl. No. 13/767,205, filed Feb. 14, 2013.
Sekii et al., "Bearing Apparatus, Spindle Motor, and Disk Drive Apparatus", U.S. Appl. No. 13/789,796, filed Mar. 8, 2013.
Sekii et al.; "Bearing Apparatus, Spindle Motor, and Disk Drive Apparatus", U.S. Appl. No. 13/790,089, filed Mar. 8, 2013.
Sato et al., "Spindle Motor and Disk Drive Apparatus", U.S. Appl. No. 13/798,857, filed Mar. 13, 2013.
Sekii et al., "Motor and Disk Drive Apparatus", U.S. Appl. No. 13/886,921, filed May 21, 2013.
Watanabe et al., "Spindle Motor and Disk Drive Apparatus", U.S. Appl. No. 13/898,921, filed May 21, 2013.
Sumiji et al., "Bearing Mechanism, Motor, and Disk Drive Apparatus", U.S. Appl. No. 13/775,467, filed Feb. 25, 2013.
Sumiji et al., "Bearing Mechanism, Motor, and Disk Drive Apparatus", U.S. Appl. No. 13/785,297, filed Mar. 5, 2013.
Kimura et al., "Bearing Apparatus, Spindle Motor, and Disk Drive Apparatus", U.S. Appl. No. 13/602,348, filed Sep. 4, 2012.
English Translation of Official Communication issued in International Patent Application No. PCT/JP2009/059556, mailed on Jan. 20, 2011.

* cited by examiner

US 8,599,513 B1

BEARING MECHANISM, MOTOR, AND DISK DRIVE APPARATUS

BACKGROUND OF THE INVENTION

1. Field of the Invention

The present invention relates to a bearing mechanism used in a motor.

2. Description of the Related Art

Some known motors used in disk drive apparatuses include a bearing mechanism using fluid dynamic pressure. In a spindle motor disclosed in FIG. 1 of JP-A 2009-136143, a bottom plate 10, a first bearing component 16, a second bearing component 18, and a fixed shaft 12 are stationary components. Radial fluid dynamic pressure bearing portions 22a and 22b are defined between the fixed shaft 12 and a rotor component 14. A thrust fluid dynamic pressure bearing portion (i.e., a thrust bearing portion) 26 is defined between the first bearing component 16 and the rotor component 14. A pumping seal 36 is defined between the second bearing component 18 and the rotor component 14. The rotor component 14 includes a circulation channel 28 defined therein. The circulation channel 28 is arranged to join a radially outer region of the thrust bearing portion 26 and a radially inner region of the pumping seal 36 to each other. A seal gap 34 is arranged radially outside the thrust bearing portion 26.

In the case where, as in the spindle motor disclosed in JP-A 2009-136143, a mouth of a communicating channel, i.e., a circulation channel, and a thrust dynamic pressure bearing portion overlap with each other, a sufficient dynamic pressure may not be easily obtained. Also, if the thrust dynamic pressure bearing portion is provided so as to avoid the mouth of the communicating channel, the thrust dynamic pressure bearing portion has to be small, and a sufficient dynamic pressure may also not be obtained. As a result, a rotating portion may not be sufficiently lifted, and abrasion may easily occur on opposing surfaces of the rotating portion and a stationary portion.

Accordingly, there is a demand for a structure which enables a large thrust dynamic pressure bearing portion to be provided easily.

SUMMARY OF THE INVENTION

A bearing mechanism according to a preferred embodiment of the present invention includes a shaft portion, a sleeve portion, and an opposing portion. The shaft portion is centered on a central axis extending in a vertical direction, and includes a cylindrical outer circumferential surface. The sleeve portion includes a sleeve body and an annular thrust plate, and is rotatable about the central axis relative to the shaft portion. The sleeve body includes a through hole in which the shaft portion is accommodated. The thrust plate is fixed to an end portion of the sleeve body on one of upper and lower sides. The opposing portion is arranged to extend radially outward from an end portion of the shaft portion on the one of the upper and lower sides, and includes a surface arranged axially opposite to an end surface of the sleeve portion on the one of the upper and lower sides with a thrust gap defined therebetween. The outer circumferential surface of the shaft portion and an inner circumferential surface of the sleeve portion are arranged to together define a radial gap therebetween, the radial gap including a radial dynamic pressure bearing portion defined therein. The thrust gap includes a thrust dynamic pressure bearing portion defined therein. A seal gap is continuously defined with an outer circumferential portion of the thrust gap, and the seal gap includes a seal portion defined therein. The sleeve body includes an annular surface and a body projecting portion. The annular surface is arranged to extend radially around the central axis, and is arranged opposite to the thrust plate. The body projecting portion is annular, and is arranged to project in an axial direction inside of the annular surface. An outer circumferential surface of the body projecting portion and an inner circumferential surface of the thrust plate are arranged to be in direct contact with each other or in indirect contact with each other with another member intervening therebetween. The sleeve portion includes a first communicating channel and a second communicating channel. The first communicating channel includes a mouth portion arranged to be open in the annular surface, and is arranged to be in communication with an end portion of the radial gap on another one of the upper and lower sides. The second communicating channel is defined between the sleeve body and the thrust plate, and is arranged to define at least a portion of a channel extending from the mouth portion to the seal gap. The mouth portion is arranged to axially overlap with the thrust dynamic pressure bearing portion. A circulation channel including the thrust gap, the radial gap, the first communicating channel, and the second communicating channel is arranged to be in communication with the seal gap. The circulation channel and the seal gap are filled with a lubricating oil.

A bearing mechanism according to another preferred embodiment of the present invention includes a shaft portion, a sleeve portion, and an opposing portion. The shaft portion is centered on a central axis extending in a vertical direction, and includes a cylindrical outer circumferential surface. The sleeve portion includes a sleeve body and an annular thrust plate, and is rotatable about the central axis relative to the shaft portion. The sleeve body includes a through hole in which the shaft portion is accommodated. The thrust plate is fixed to an end portion of the sleeve body on one of upper and lower sides. The opposing portion is arranged to extend radially outward from an end portion of the shaft portion on the one of the upper and lower sides, and includes a surface arranged axially opposite to an end surface of the sleeve portion on the one of the upper and lower sides with a thrust gap defined therebetween. The outer circumferential surface of the shaft portion and an inner circumferential surface of the sleeve portion are arranged to together define a radial gap therebetween, the radial gap including a radial dynamic pressure bearing portion defined therein. The thrust gap includes a thrust dynamic pressure bearing portion defined therein. A seal gap is continuously defined with an outer circumferential portion of the thrust gap, and the seal gap includes a seal portion defined therein. The sleeve body includes an annular surface, a body recessed portion, and a body projecting portion. The annular surface is arranged to extend radially around the central axis, and is arranged opposite to the thrust plate. The body recessed portion is annular, and is recessed in an axial direction inside of the annular surface. The body projecting portion is annular, and is arranged to project in the axial direction inside of the body recessed portion. The thrust plate includes a plate projecting portion arranged to project into the body recessed portion around an inner circumferential surface thereof. The plate projecting portion is annular, and includes the body projecting portion arranged inside thereof. An outer circumferential surface of the plate projecting portion and a side surface of the body recessed portion are arranged to be in direct contact with each other or in indirect contact with each other with another member intervening therebetween. The sleeve portion includes a first communicating channel and a second communicating channel. The first communicating channel includes a mouth portion arranged to be open in the annular surface, and is arranged to be in communication with an end portion of the radial gap on another one of the upper and lower sides. The second communicating channel is defined between the sleeve body and the thrust plate, and is arranged to define at least a portion of a channel extending from the mouth portion to the seal gap. The mouth portion is arranged to axially overlap with the thrust dynamic pressure bearing portion. A circulation channel including the thrust gap, the radial gap, the first communicating channel, and the second communicating channel is arranged to be in communication with the seal gap. The circulation channel and the seal gap are filled with a lubricating oil.

The preferred embodiments of the present invention enable a large thrust dynamic pressure bearing portion to be provided easily.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention and modifications thereof will now be described with reference to the drawings. It is assumed herein that a vertical direction is defined as a direction in which a central axis of a motor extends, and that an upper side and a lower side along the central axis of the motor are referred to simply as an upper side and a lower side, respectively. It should be noted, however, that the above definitions of the vertical direction and the upper and lower sides are not meant to indicate relative positions or directions of different members or portions when they are actually installed in a device. Also note that directions parallel to or substantially parallel to the central axis are referred to by the term "axial direction", "axial", or "axially", that radial directions centered on the central axis are simply referred to by the term "radial direction", "radial", or "radially", and that a circumferential direction about the central axis is simply referred to by the term "circumferential direction", "circumferential", or "circumferentially".

Figure 1:
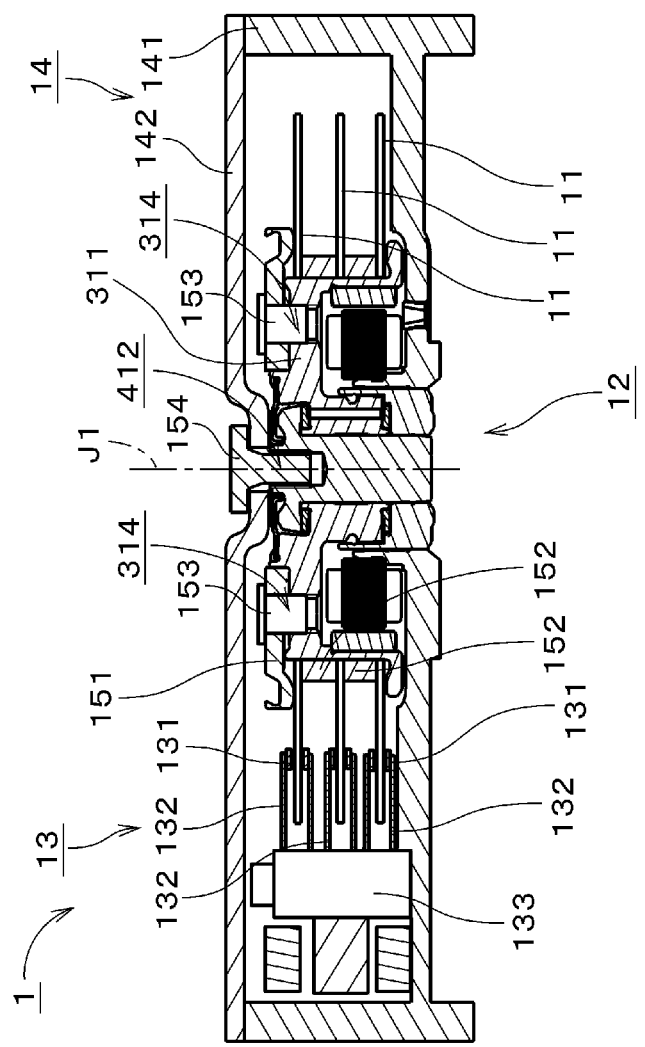
FIG. 1 is a cross-sectional view of a disk drive apparatus according to a preferred embodiment of the present invention.

FIG. 1 is a vertical cross-sectional view of a disk drive apparatus 1 including a spindle motor (hereinafter referred to simply as a "motor") 12 according to a preferred embodiment of the present invention. The disk drive apparatus 1 is preferably a so-called hard disk drive apparatus. The disk drive apparatus 1 preferably includes, for example, three disks 11, the motor 12, an access portion 13, and a housing 14. The motor 12 is arranged to rotate the disks 11. The access portion 13 is arranged to perform at least one of reading and writing of information from or to the disks 11.

The housing 14 preferably includes a first housing member 141 and a plate-shaped second housing member 142. The second housing member 142 is fitted to the first housing member 141 to define the housing 14. The housing 14 is arranged to contain the disks 11, the motor 12, and the access portion 13. An interior space of the disk drive apparatus 1 is preferably a clean space with no, or only an extremely small amount of, dirt or dust. In the present preferred embodiment, air is arranged in the interior space of the disk drive apparatus 1. Note that the interior space of the disk drive apparatus 1 may be filled with any of a helium gas, a hydrogen gas, or a mixture of either or both of these gases and air.

The three disks 11 are fixed to a rotor hub 31 of the motor 12 through a clamper 151 and spacers 152 such that the disks 11 are arranged at regular or substantially regular intervals in a direction parallel or substantially parallel to a central axis J1 of the motor 12. The access portion 13 preferably includes six heads 131, six arms 132, and a head actuator mechanism 133, for example. Each of the heads 131 is arranged in close proximity to one of the disks 11 to magnetically perform the reading and/or writing of information from or to the disk 11. Each of the arms 132 is arranged to support an associated one of the heads 131. The head actuator mechanism 133 is arranged to actuate each of the arms 132 to move an associated one of the heads 131 relative to an associated one of the disks 11. The above mechanism enables the head 131 to access to a desired location on the rotating disk 11 with the head 131 being arranged in close proximity to the disk 11. Note that the number of disks 11 is not limited to three, but may be any of one, two, or more than three if so desired.

Figure 2:
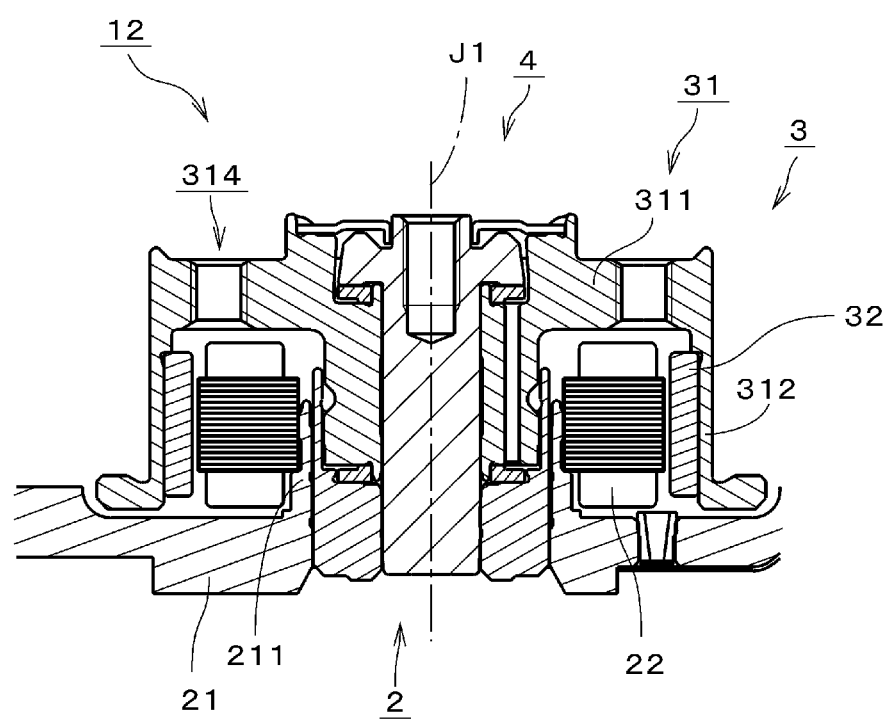
FIG. 2 is a cross-sectional view of a motor according to the above preferred embodiment.

FIG. 2 is a vertical cross-sectional view of the motor 12. The motor 12 is preferably an outer-rotor motor. The motor includes a stationary portion 2, which is a stationary assembly, a rotating portion 3, which is a rotating assembly, and a bearing mechanism 4. The rotating portion 3 is supported by the bearing mechanism 4 such that the rotating portion 3 is rotatable about the central axis J1 with respect to the stationary portion 2.

The stationary portion 2 preferably includes a base plate 21, which is a base portion, and a stator 22. The base plate 21 and the first housing member 141 illustrated in FIG. 1 are preferably defined by a single monolithic member. The base plate 21 is a portion of the housing 14. The stator 22 is fixed to a circumference of a cylindrical holder 211 included in the base plate 21. The bearing mechanism 4 is fixed to a hole portion defined inside the holder 211. Note that the base plate 21 and the first housing member 141 may alternatively be defined by separate members if so desired.

The rotating portion 3 includes the rotor hub 31 and a rotor magnet 32. The rotor hub 31 preferably includes a cover portion 311 and a cylindrical portion 312. The cover portion 311 is arranged to extend radially outward from an upper portion of the bearing mechanism 4. The cylindrical portion 312 is arranged to extend downward from an outer edge portion of the cover portion 311. The rotor magnet 32 is fixed to an inside of the cylindrical portion 312. The rotor magnet 32 is arranged radially opposite to the stator 22. A torque is produced between the stator 22 and the rotor magnet 32.

A magnetic center of the stator 22 is preferably arranged at an axial height lower than an axial height of a magnetic center of the rotor magnet 32. In the motor 12, magnetic action which attracts the rotor magnet 32 downward is produced between the rotor magnet 32 and the stator 22. Note that this is not essential to the present invention and it is also possible for the magnetic center of the stator 22 to be arranged at the same axial height as that of the magnetic center of the rotor magnet 32.

The cover portion 311 preferably includes screw holes 314 used to fix the clamper 151, which is arranged to clamp the disks 11 illustrated in FIG. 1. Each screw hole 314 is arranged above the stator 22, and passes through the cover portion 311 in the vertical direction. Referring to FIG. 1, when the clamper 151 is attached to the motor 12, screws 153 are inserted into through holes of the clamper 151 and the screw holes 314, such that the clamper 151 is fixed onto an upper surface of the cover portion 311.

Figure 3:
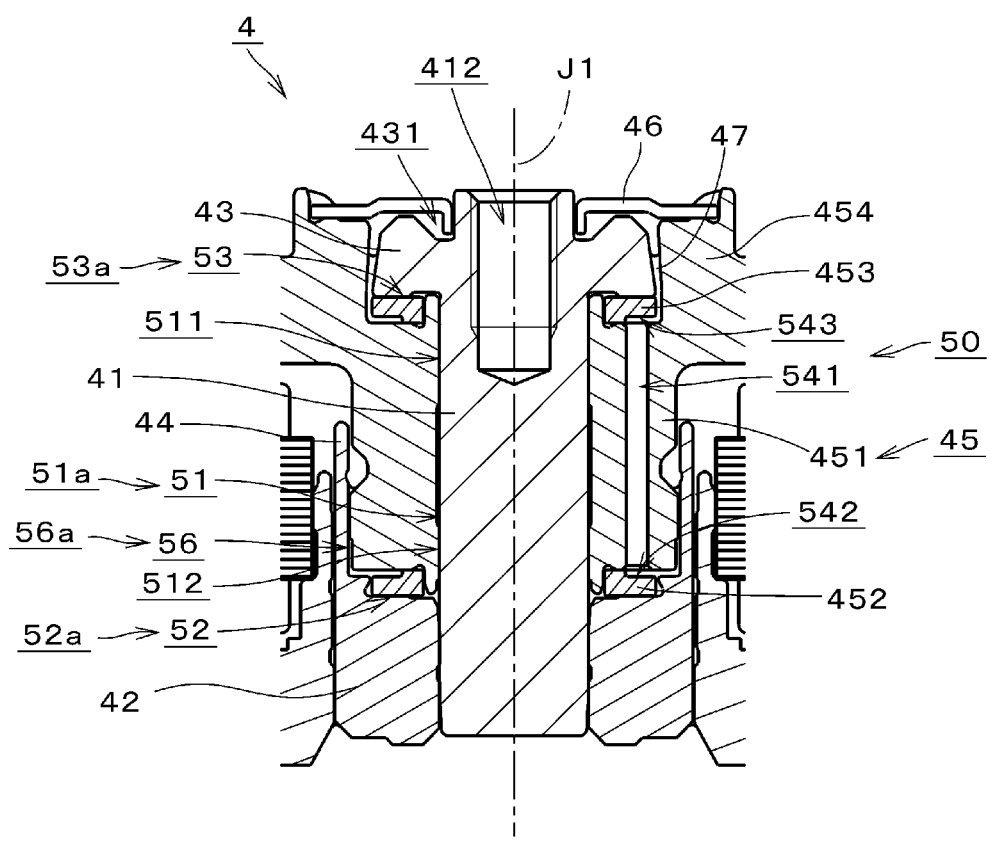
FIG. 3 is a cross-sectional view of a bearing mechanism according to the above preferred embodiment.

FIG. 3 is a diagram illustrating the bearing mechanism in an enlarged form. The bearing mechanism 4 preferably includes a shaft portion 41, a lower opposing portion 42, an upper opposing portion 43, a lower outer annular portion 44, a sleeve portion 45, a cap 46, and a lubricating oil 47. Each of the shaft portion 41, the lower opposing portion 42, the upper opposing portion 43, and the lower outer annular portion 44 may be regarded as a portion of the stationary portion 2. Each of the sleeve portion 45 and the cap 46 may be regarded as a portion of the rotating portion 3.

The shaft portion 41 is centered on the central axis J1, and includes a cylindrical outer circumferential surface. The shaft portion 41 is preferably, for example, press fitted and thus fixed to a hole portion defined inside the lower opposing portion 42, so that the shaft portion 41 is oriented in the vertical direction along the central axis J1. The shaft portion 41 is preferably made of, for example, stainless steel or the like. An upper portion of the shaft portion 41 preferably includes a fastening hole 412. Referring to FIG. 1, a fastener 154 (such as a screw, for example) is preferably inserted into a through hole defined in a central portion of the second housing member 142 and the fastening hole 412 such that the second housing member 142 is fixed to the motor 12.

The lower opposing portion 42 is preferably made of, for example, copper, high-strength brass, or the like. The lower opposing portion 42 is arranged to extend radially outward from a lower end portion of the shaft portion 41. An upper surface of the lower opposing portion 42 is arranged axially opposite to a lower end surface of the sleeve portion 45. The lower outer annular portion 44 is arranged to extend upward from an outer edge portion of the lower opposing portion 42. Accordingly, the position of the lower outer annular portion 44 relative to the lower opposing portion 42 is fixed. The lower outer annular portion 44 is arranged outside an outer circumferential surface of the sleeve portion 45. An inner circumferential surface of the lower outer annular portion 44 is preferably cylindrical or substantially cylindrical, and is arranged to surround at least a portion of the outer circumferential surface of the sleeve portion 45. The upper opposing portion 43 is arranged to extend radially outward from an upper end portion of the shaft portion above the sleeve portion 45. A lower surface of the upper opposing portion 43 is arranged axially opposite to an upper end surface of the sleeve portion 45. The cap 46 is fixed on an upper side of the sleeve portion 45. The cap 46 is preferably arranged above the upper opposing portion 43.

The shaft portion 41 is arranged inside the sleeve portion 45. The sleeve portion 45 is supported by the shaft portion 41 such that the sleeve portion 45 is rotatable about the central axis J1. The sleeve portion 45 preferably includes a sleeve body 451, a lower thrust plate 452, an upper thrust plate 453, and a flange portion 454. The sleeve body 451 is preferably made of, for example, stainless steel, aluminum, copper, or the like. The sleeve body 451 includes a through hole in which the shaft portion 41 is accommodated. The sleeve body 451 preferably includes a vertical communicating channel 541 arranged to extend in the vertical direction as a first communicating channel. The sleeve body 451 is arranged between the outer circumferential surface of the shaft portion 41 and the inner circumferential surface of the lower outer annular portion 44.

The flange portion 454 is arranged to project radially outward from an upper portion of the sleeve body 451. The flange portion 454 is preferably defined together with the cover portion 311 as a single monolithic member, as illustrated in FIG. 2. The flange portion 454 and the sleeve body 451 may be defined by separate members if so desired. The cover portion 311 and the flange portion 454 may also be defined by separate members if so desired.

The cap 46 is preferably plated-shaped or substantially plate-shaped and in the shape of a circular or substantially circular ring. An outer circumferential portion of the cap 46 is fixed to an upper portion of the flange portion 454. An inner circumferential portion of the cap 46 is arranged above the upper opposing portion 43. An inner circumferential end portion of the cap 46 is arranged to bend downward. An upper portion of the upper opposing portion 43 includes an annular recessed portion 431 recessed downward. A lower end of the inner circumferential end portion of the cap 46 is preferably arranged inside the recessed portion 431.

The lower thrust plate 452 is annular. The lower thrust plate 452 is fixed to a lower end portion of the sleeve body 451. A lower surface of the lower thrust plate 452 is a lower surface of the sleeve portion 45. A lower horizontal communicating channel 542 is preferably defined between the sleeve body 451 and the lower thrust plate 452 as a second communicating channel. The lower horizontal communicating channel 542 is arranged to extend from a lower end of the vertical communicating channel 541 to the outer circumferential surface of the sleeve portion 45. The lower thrust plate 452 preferably enables the lower horizontal communicating channel 542 to be easily defined.

The upper thrust plate 453 is annular. The upper thrust plate 453 is fixed to the upper portion of the sleeve body 451. An upper surface of the upper thrust plate 453 is an upper surface of the sleeve portion 45. An upper horizontal communicating channel 543 is preferably defined between the sleeve body 451 and the upper thrust plate 453 as a third communicating channel. The upper horizontal communicating channel 543 is preferably arranged to extend from an upper end of the vertical communicating channel 541 to an outer circumferential surface of the upper thrust plate 453. The upper thrust plate 453 preferably enables the upper horizontal communicating channel 543 to be easily defined. The sleeve portion 45 includes the communicating channels as described above, and the communicating channels are defined by the vertical communicating channel 541, the lower horizontal communicating channel 542, and the upper horizontal communicating channel 543.

Figure 4:
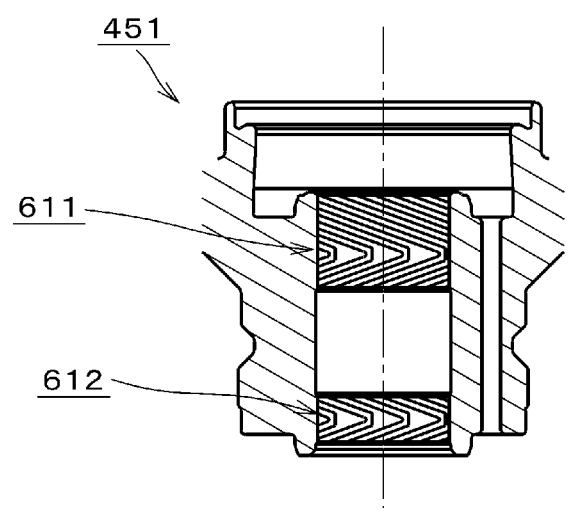
FIG. 4 is a cross-sectional view of a sleeve body according to the above preferred embodiment.

FIG. 4 is a cross-sectional view of the sleeve body 451. In FIG. 4, a portion of the sleeve body 451 beyond a section of the sleeve body 451 is also depicted. An inner circumferential surface of the sleeve body 451, that is, an inner circumferential surface of the sleeve portion 45, preferably includes dynamic pressure grooves defined therein. Referring to FIG. 3, a radial dynamic pressure bearing portion 51a is thereby defined in a radial gap 51 defined between the outer circumferential surface of the shaft portion 41 and the inner circumferential surface of the sleeve portion 45. The radial dynamic pressure bearing portion 51a is defined by an upper radial dynamic pressure bearing portion 511 and a lower radial dynamic pressure bearing portion 512. The upper radial dynamic pressure bearing portion 511 includes an upper radial dynamic pressure groove array 611 arranged in a herringbone pattern. The lower radial dynamic pressure bearing portion 512 includes a lower radial dynamic pressure groove array 612 arranged in a herringbone pattern. An upper portion of each of dynamic pressure grooves of the upper radial dynamic pressure groove array 611 preferably has an axial dimension greater than that of a lower portion thereof. An upper portion of each of dynamic pressure grooves of the lower radial dynamic pressure groove array 612 preferably has an axial dimension equal to that of a lower portion thereof.

Figure 5:
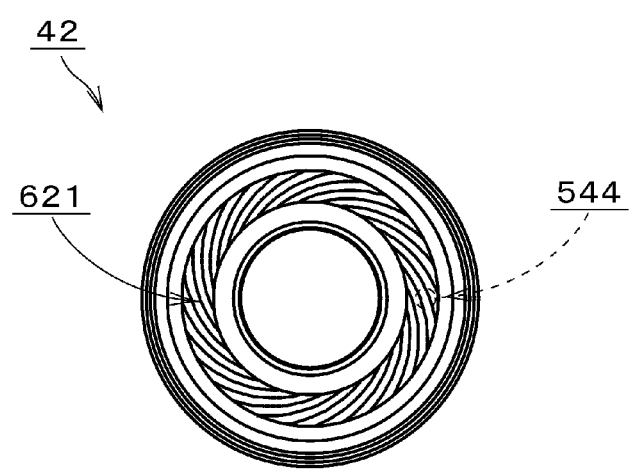
FIG. 5 is a plan view of a lower opposing portion according to the above preferred embodiment.

FIG. 5 is a plan view of the lower opposing portion 42. The upper surface of the lower opposing portion 42 preferably includes a lower thrust dynamic pressure groove array 621 arranged in a spiral pattern as a dynamic pressure generating groove array. Referring to FIG. 3, a lower thrust dynamic pressure bearing portion 52a is defined in a lower thrust gap 52 defined between the lower end surface of the sleeve portion 45 and the upper surface of the lower opposing portion 42. In other words, the upper surface of the lower opposing portion 42 is arranged axially opposite to the lower end surface of the sleeve portion 45 with the lower thrust gap 52 intervening therebetween.

Figure 6:
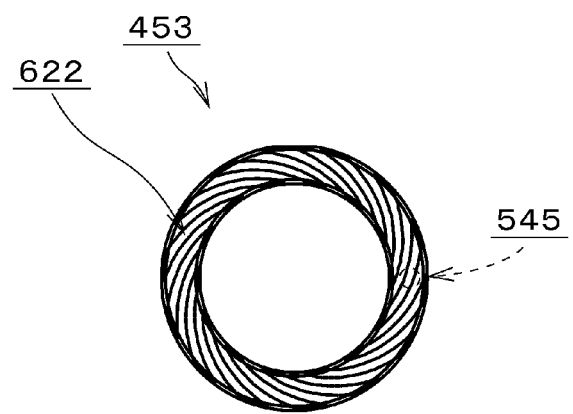
FIG. 6 is a plan view of an upper thrust plate according to the above preferred embodiment.

FIG. 6 is a plan view of the upper thrust plate 453. The upper surface of the upper thrust plate 453 preferably includes an upper thrust dynamic pressure groove array 622 arranged in a spiral pattern as a dynamic pressure generating groove array. Referring to FIG. 3, an upper thrust dynamic pressure bearing portion 53a is defined in an upper thrust gap 53 defined between the upper end surface of the sleeve portion 45 and the lower surface of the upper opposing portion 43. In other words, the lower surface of the upper opposing portion 43 is arranged axially opposite to the upper end surface of the sleeve portion with the upper thrust gap 53 intervening therebetween. A lower seal portion 56a is preferably defined in a lower seal gap defined between the outer circumferential surface of the sleeve portion 45 and the inner circumferential surface of the lower outer annular portion 44. Note that the lower seal gap 56 may be only a portion of a gap defined between the outer circumferential surface of the sleeve portion 45 and the inner circumferential surface of the lower outer annular portion 44. The lower outer annular portion 44 enables the lower seal gap 56 to be easily defined. Although the lower seal gap 56 may be provided at a different location, it is preferable that the lower seal gap 56 should be arranged radially outward of the lower thrust dynamic pressure bearing portion 52a.

While the upper surface of the upper thrust plate 453 includes the thrust dynamic pressure groove array, the lower surface of the lower thrust plate 452 preferably includes no thrust dynamic pressure groove array. This contributes to preventing confusion between the upper and lower thrust plates 453 and 452 when the bearing mechanism 4 is assembled.

Figure 7:
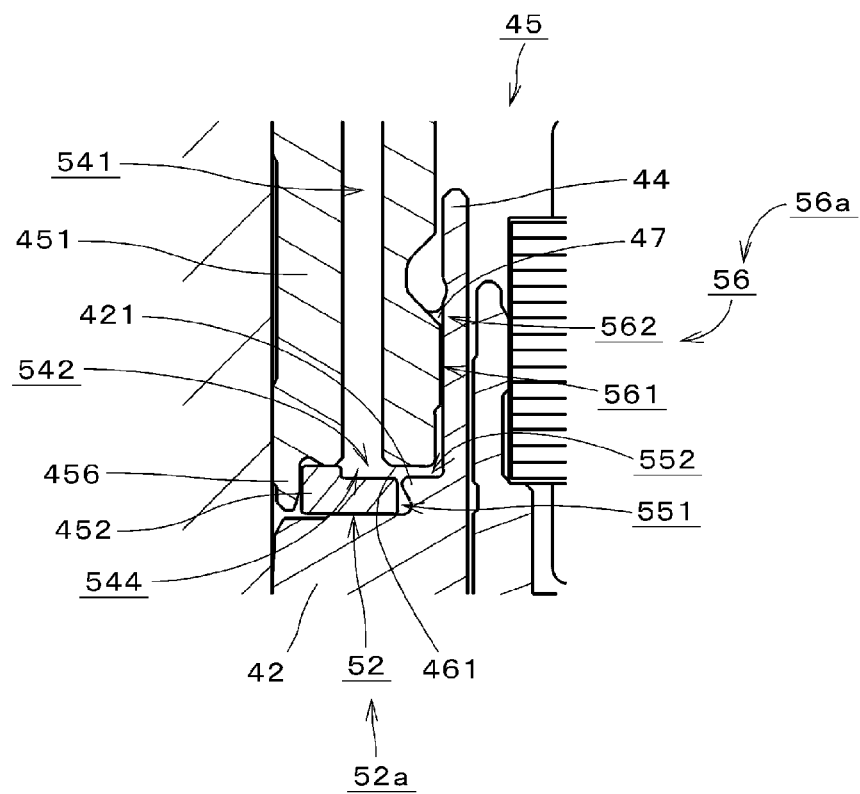
FIG. 7 is a cross-sectional view illustrating a lower horizontal communicating channel and its vicinity according to the above preferred embodiment in an enlarged form.
Figure 8:
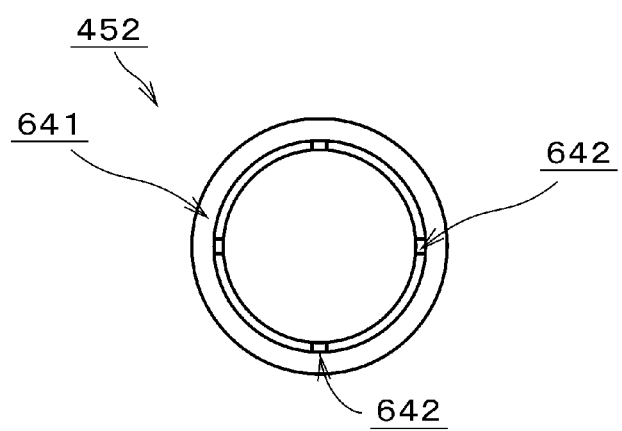
FIG. 8 is a plan view of a lower thrust plate according to the above preferred embodiment.

FIG. 7 is a cross-sectional view illustrating the lower horizontal communicating channel 542 and its vicinity in an enlarged form. FIG. 8 is a plan view of the lower thrust plate 452. An upper surface of the lower thrust plate 452 preferably includes a height changing portion 641. The height changing portion 641 is arranged to extend over an entire circumferential extent of the upper surface of the lower thrust plate 452. A portion (hereinafter referred to as a "radially outer portion") of the upper surface of the lower thrust plate 452 which is arranged radially outside the height changing portion 641 is arranged at an axial height lower than an axial height of a portion (hereinafter referred to as a "radially inner portion") of the upper surface of the lower thrust plate 452 which is arranged radially inside the height changing portion 641. The radially outer portion and a lower portion of the sleeve body 451 are arranged to together define the lower horizontal communicating channel 542 therebetween. Use of the height changing portion 641 enables the lower horizontal communicating channel 542 to be easily defined. Since the height changing portion 641 is arranged to extend over the entire circumferential extent of the upper surface of the lower thrust plate 452, it is possible to attach the lower thrust plate 452 to the sleeve body 451 without having to pay attention to the orientation of the lower thrust plate 452. This eliminates a need to provide the lower thrust plate 452 with a mark or a cut which makes the orientation of the lower thrust plate 452 recognizable, making it possible to easily secure a sufficient size of the lower thrust dynamic pressure bearing portion 52a. The radially inner portion of the upper surface of the lower thrust plate 452 preferably includes a plurality of adhesive grooves 642 each of which is arranged to extend in a radial direction.

The sleeve body 451 preferably includes a lower annular surface 461 arranged to extend radially around the central axis J1, and arranged opposite to the upper surface of the lower thrust plate 452. The lower annular surface 461 is a portion of a lower surface of the sleeve body 451. The vertical communicating channel 541 preferably includes a lower mouth portion 544 arranged to be open in the lower annular surface 461. At least a portion of the radially outer portion, i.e., the portion of the upper surface of the lower thrust plate 452 which is arranged radially outside the height changing portion 641 illustrated in FIG. 8, is arranged axially opposite to the lower mouth portion 544. The radially outer portion is arranged axially farther away from the lower annular surface 461 than the radially inner portion, i.e., the portion of the upper surface of the lower thrust plate 452 which is arranged radially inside the height changing portion 641. The radially inner portion is arranged to be in contact with the lower annular surface 461. This enables the axial position of the lower thrust plate 452 to be easily determined at the time of assemblage.

An inner circumferential portion of the lower portion of the sleeve body 451 includes a lower projecting portion 456, which is a body projecting portion arranged to project downward. The lower projecting portion 456 is arranged radially inside the lower annular surface 461, and is arranged in the shape of a ring centered on the central axis J1. The lower projecting portion 456 is inserted in the lower thrust plate 452. The lower projecting portion 456 preferably enables the lower thrust plate 452 to be easily attached to a desired location.

The lower thrust plate 452 preferably has an outside diameter smaller than the outside diameter of the lower portion of the sleeve body 451. In other words, the sleeve body 451 includes a large diameter portion in the lower portion thereof, while the lower thrust plate 452 is a small diameter portion. A lower portion of the sleeve portion 45 preferably includes the large diameter portion and the small diameter portion arranged below the large diameter portion and having a diameter smaller than that of the large diameter portion. Meanwhile, an outer circumferential portion of the lower opposing portion 42 includes an outer circumferential projecting portion 421 arranged to project upward. The outer circumferential projecting portion 421 is arranged inside the lower outer annular portion 44. The outer circumferential projecting portion 421 is arranged radially outside the lower thrust plate 452. That is, the outer circumferential projecting portion 421 is arranged radially opposite to an outer circumferential surface of the small diameter portion. A vertical gap 551 extending in an axial direction is preferably defined between an outer circumferential surface of the lower thrust plate 452 and an inner circumferential surface of the outer circumferential projecting portion 421. An upper end of the vertical gap 551 is joined to an outer circumferential portion of the lower horizontal communicating channel 542. A lower end of the vertical gap 551 is joined to an outer circumferential portion of the lower thrust gap 52.

The outer circumferential projecting portion 421 is arranged axially opposite to the lower portion of the sleeve body 451. That is, an upper surface of the outer circumferential projecting portion 421 is arranged axially opposite to a lower surface of the large diameter portion. A horizontal gap 552 is defined between the upper surface of the outer circumferential projecting portion 421 and the lower annular surface 461 of the sleeve body 451. The horizontal gap 552 is arranged to extend radially. An inner circumferential portion of the horizontal gap 552 is joined to the outer circumferential portion of the lower horizontal communicating channel 542. An outer circumferential portion of the horizontal gap 552 is joined to a lower end of the lower seal gap 56.

As a result of the lower horizontal communicating channel 542 being defined by the lower thrust plate 452, the lower horizontal communicating channel 542 defines at least a portion of a channel extending from the lower mouth portion 544 to the lower seal gap 56. The lower horizontal communicating channel 542 essentially joins the lower mouth portion 544 of the vertical communicating channel 541 and the lower seal gap 56 to each other. Therefore, the horizontal gap 552 may be regarded as a portion of the lower seal portion 56a. Also, the lower seal gap 56 essentially connects with the outer circumferential portion of the lower thrust gap 52. The lower mouth portion 544 of the vertical communicating channel 541 and the lower thrust dynamic pressure bearing portion 52a are arranged to axially overlap with each other. This enables the lower thrust dynamic pressure bearing portion 52a to be easily increased in size which further enables the lower thrust dynamic pressure bearing portion 52a to easily produce a sufficient lifting force for the rotating portion 3. In the sleeve portion 45, the lower horizontal communicating channel 542 is arranged to be open radially outwardly. This makes it easy to secure a sufficient size of the lower thrust dynamic pressure bearing portion 52a.

The axial width of the lower thrust gap 52 is preferably smaller than the axial width of a gap defined between the lower projecting portion 456 and the lower opposing portion 42. As a result, a thrust dynamic pressure is obtained stably. A difference between the axial width of the lower thrust gap 52 and the axial width of the gap defined between the lower projecting portion 456 and the lower opposing portion 42 is preferably greater than the depth of each dynamic pressure groove of the lower thrust dynamic pressure bearing portion 52a and smaller than the axial width of the lower horizontal communicating channel 542. As a result, the thrust dynamic pressure is more stably obtained. The "width of the lower thrust gap 52" mentioned here refers to the width of the lower thrust gap 52 when the motor 12 is rotating at a constant rotational speed. When the motor 12 is in a stopped state, the lower thrust gap 52 may be nonexistent, that is, the lower thrust plate 452 and the lower opposing portion 42 may be in contact with each other.

The lower seal portion 56a is preferably a pumping seal portion, and includes a pumping portion 561 and a buffer portion 562. A lower end of the pumping portion 561 is joined to the outer circumferential portion of the horizontal gap 552. The buffer portion 562 is arranged above the pumping portion 561, and is joined to an upper end of the pumping portion 561.

The lower seal gap 56 preferably is cylindrical or substantially cylindrical in the pumping portion 561. The inner circumferential surface of the lower outer annular portion 44 preferably includes grooves in a spiral pattern arranged in the pumping portion 561. A force that presses the lubricating oil 47 downward is produced in the pumping portion 561 by rotation of the sleeve portion 45.

In the buffer portion 562, the outer circumferential surface of the sleeve portion 45 is preferably angled radially inward with increasing height. In the buffer portion 562, the radial width of the lower seal gap 56 gradually increases with increasing height. A surface of the lubricating oil 47 is defined in the buffer portion 562 when the sleeve portion 45 is in a stationary state. Once the sleeve portion 45 rotates, the lubricating oil 47 flows from the buffer portion 562 to the pumping portion 561, lowering the surface of the lubricating oil 47. Note that the surface of the lubricating oil 47 may also be defined in the pumping portion 561.

Figure 9:
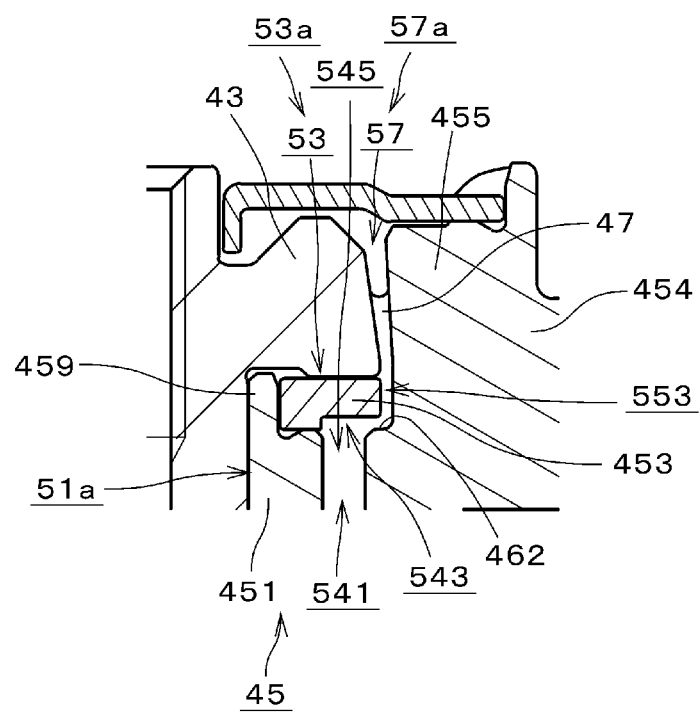
FIG. 9 is a cross-sectional view illustrating an upper horizontal communicating channel and its vicinity according to the above preferred embodiment in an enlarged form.

FIG. 9 is a cross-sectional view illustrating the upper horizontal communicating channel 543 and its vicinity in an enlarged form. A lower surface of the upper thrust plate 453 is preferably identical or substantially identical to the upper surface of the lower thrust plate 452 illustrated in the plan view of FIG. 8. That is, the lower surface of the upper thrust plate 453 preferably includes a height changing portion. The height changing portion is arranged to extend over an entire circumferential extent of the lower surface of the upper thrust plate 453. A portion (hereinafter referred to as a "radially outer portion") of the lower surface of the upper thrust plate 453 which is arranged radially outside the height changing portion is arranged at an axial height higher than an axial height of a portion (hereinafter referred to as a "radially inner portion") of the lower surface of the upper thrust plate 453 which is arranged radially inside the height changing portion. The radially outer portion and the upper portion of the sleeve body 451 are preferably arranged to together define the upper horizontal communicating channel 543 therebetween. Since the height changing portion is arranged to extend over the entire circumferential extent of the lower surface of the upper thrust plate 453, it is possible to attach the upper thrust plate 453 to the sleeve body 451 without paying attention to the orientation of the upper thrust plate 453. The radially inner portion, i.e., the portion of the lower surface of the upper thrust plate 453 which is arranged radially inside the height changing portion, includes a plurality of adhesive grooves, each of which is arranged to extend in the radial direction in a manner similar to that illustrated in FIG. 8.

The sleeve body 451 preferably includes an upper annular surface 462 arranged to extend radially around the central axis J1, and arranged opposite to the lower surface of the upper thrust plate 453. The upper annular surface 462 is preferably a portion of an upper surface of the sleeve body 451. The radially inner portion, i.e., the portion of the lower surface of the upper thrust plate 453 which is arranged radially inside the height changing portion, is arranged to be in axial contact with the upper annular surface 462. The vertical communicating channel 541 preferably includes an upper mouth portion 545 arranged to be open in the upper annular surface 462. At least a portion of the radially outer portion, i.e., the portion of the lower surface of the upper thrust plate 453 which is arranged radially outside the height changing portion, is arranged axially opposite to the upper mouth portion 545.

An inner circumferential portion of the upper portion of the sleeve body 451 preferably includes an upper projecting portion 459, which is a body projecting portion arranged to project upward. The upper projecting portion 459 is inserted in the upper thrust plate 453. The upper projecting portion 459 enables the upper thrust plate 453 to be easily attached at a desired position in a direction perpendicular or substantially perpendicular to the central axis J1. An upper end of the upper projecting portion 459 is arranged at an axial height higher than an axial height of the upper surface of the upper thrust plate 453. In addition, a portion of the radial dynamic pressure bearing portion 51a is arranged to radially overlap with the upper thrust plate 453. That is, the upper projecting portion 459 contributes to arranging the radial dynamic pressure bearing portion 51a to extend to a higher position. This brings a center of the radial dynamic pressure bearing portion 51a closer to a center of the rotating portion 3, and contributes to reducing vibrations.

Providing the upper horizontal communicating channel 543 by using the upper thrust plate 453 enables the upper mouth portion 545 and the upper thrust dynamic pressure bearing portion 53a to axially overlap with each other. This enables the upper thrust dynamic pressure bearing portion 53a to be increased in size.

An inner circumferential portion of the flange portion 454 is arranged to project upward from an outer circumferential portion of the sleeve body 451 to surround a radially outer side of the upper opposing portion 43. That is, a cylindrical or substantially cylindrical inner circumferential surface of the flange portion 454 is arranged to surround at least a portion of an outer circumferential surface of the upper opposing portion 43 from radially outside. The inner circumferential surface of the flange portion 454 is arranged radially opposite to the outer circumferential surface of the upper thrust plate 453 as well. The inner circumferential portion of the flange portion 454 will be hereinafter referred to as an "upper outer annular portion 455". The upper outer annular portion 455 is a portion whose position relative to the sleeve portion 45 is fixed.

An upper seal gap 57 is preferably defined between an inner circumferential surface of the upper outer annular portion 455 and the outer circumferential surface of the upper opposing portion 43. The upper horizontal communicating channel 543 is arranged to join the upper mouth portion 545 and the upper seal gap 57 to each other. An upper seal portion 57a is defined in the upper seal gap 57. A vertical gap 553 extending in the axial direction is defined between the outer circumferential surface of the upper thrust plate 453 and the inner circumferential surface of the upper outer annular portion 455. An upper end of the vertical gap 553 connects with both a lower end of the upper seal gap 57 and an outer circumferential portion of the upper thrust gap 53. That is, the upper seal gap 57 connects with the upper thrust gap 53. A lower end of the vertical gap 553 is joined to an outer circumferential portion of the upper horizontal communicating channel 543.

The radial width of the upper seal gap 57 is arranged to increase with increasing height. At the upper seal portion 57a, the outer circumferential surface of the upper opposing portion 43 is angled radially inward with increasing height, and the inner circumferential surface of the upper outer annular portion 455 is also angled radially inward with increasing height. The upper seal portion 57a is thus angled radially inward with increasing height. This enables any air bubbles generated in the lubricating oil 47 to be efficiently discharged using a centrifugal force acting on the lubricating oil 47.

Referring to FIG. 3, a circulation channel 50 preferably including, as main portions thereof, the lower thrust gap 52, the radial gap 51, the upper thrust gap 53, the vertical gap 553, the upper horizontal communicating channel 543, the vertical communicating channel 541, the lower horizontal communicating channel 542, and the vertical gap 551 is defined. The circulation channel 50 is filled with the lubricating oil 47. The circulation channel 50 and the lower seal gap 56 are arranged to be in communication with each other. The circulation channel 50 and the upper seal gap 57 are also arranged to be in communication with each other. The lubricating oil 47 is arranged to fill an area extending from the circulation channel to the lower seal gap 56, and also fill an area extending from the circulation channel 50 to the upper seal gap 57. That is, the horizontal gap 552, which extends from a radially outer opening end of the lower horizontal communicating channel 542 to the lower seal gap 56, is filled with the lubricating oil 47. The vertical gap 553, which extends from a radially outer opening end of the upper horizontal communicating channel 543 to the upper seal gap 57, is also filled with the lubricating oil 47.

The lower thrust plate 452 and the upper thrust plate 453 of the motor 12 are arranged to contribute to increasing a load-carrying capacity of the motor 12, and reducing a lift-starting rotation rate of the motor 12. Moreover, a time in which surfaces are in sliding contact with each other at each thrust bearing when the motor 12 is started or stopped is reduced, which leads to an improved life of the motor 12. The improvement in the performance of each thrust bearing makes it possible to increase the diameter of the shaft to reduce radial bearing damping and thus to reduce vibration response at high frequencies. Each of the lower and upper thrust plates 452 and 453 is preferably produced by, for example, press working, cutting, or the like. Each of the lower and upper thrust plates 452 and 453 may be made of, for example, either a solid material or a sintered material.

As described above, the upper portion of each of the dynamic pressure grooves of the upper radial dynamic pressure groove array 611 preferably has an axial dimension greater than that of the lower portion thereof, while the upper portion of each of the dynamic pressure grooves of the lower radial dynamic pressure groove array 612 preferably has an axial dimension equal to that of the lower portion thereof. A dynamic pressure which presses the lubricating oil 47 axially downward is thus produced in the radial dynamic pressure bearing portion 51a. This dynamic pressure is used to cause the lubricating oil 47 to flow downward in the radial gap 51 of the circulation channel 50 during the rotation of the sleeve portion 45. This contributes to easily eliminating the possibility that a negative pressure will be produced in the lower seal portion 56a, which is the pumping seal portion.

Figure 10:
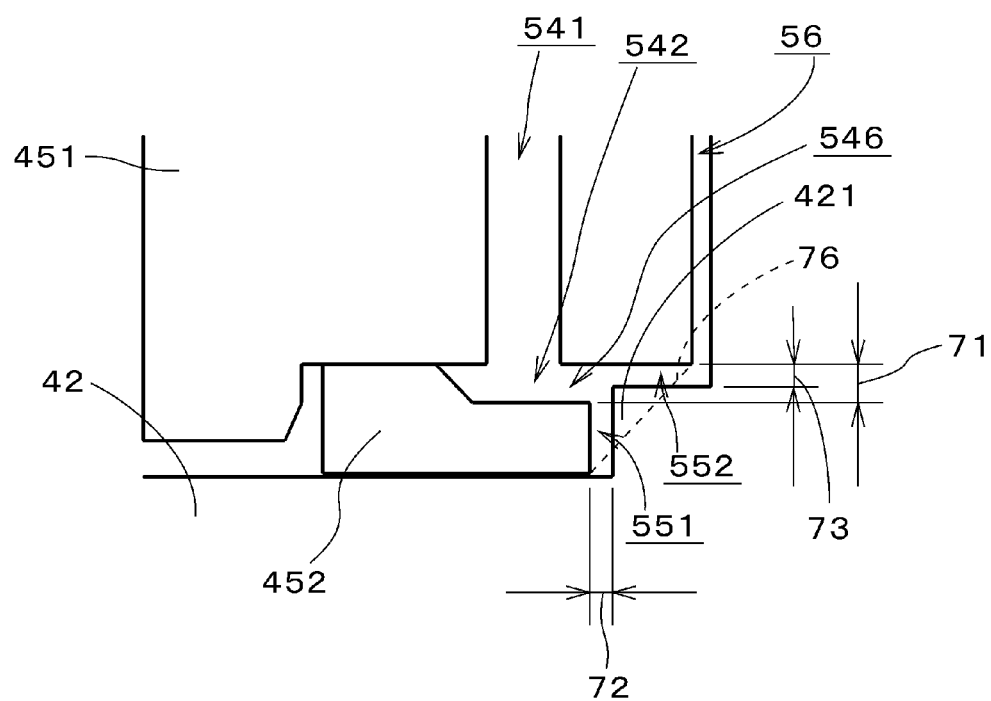
FIG. 10 is a diagram illustrating the lower thrust plate and its vicinity in a simplified form.

FIG. 10 is a diagram illustrating the lower thrust plate 452 and its vicinity in a simplified form. In FIG. 10 and similar figures referenced below, parallel oblique lines for sections are omitted. During manufacture of the bearing mechanism 4, the lubricating oil 47 is injected into the bearing mechanism 4 through the upper seal gap 57. Because the sleeve body 451 and the flange portion 454 are preferably defined by a single continuous monolithic member, it is substantially impossible to inject the lubricating oil 47 into the bearing mechanism 4 through the lower seal gap 56. At the time of injection of the lubricating oil 47, the lower surface of the lower thrust plate 452 is in axial contact with the upper surface of the lower opposing portion 42 as illustrated in FIG. 10.

Accordingly, a portion of the lubricating oil 47 which flows through the vertical communicating channel 541 and the lower horizontal communicating channel 542 at the time of the injection of the lubricating oil 47 may be stopped by surface tension of the lubricating oil 47 at a side mouth portion 546, which is an exit of the lower horizontal communicating channel 542. The side mouth portion 546 is arranged to be open at a boundary between the lower thrust plate 452 and the lower portion of the sleeve body 451, that is, a boundary between the large diameter portion and the small diameter portion. In the present preferred embodiment, the side mouth portion 546 is arranged at the outer circumferential surface of the lower thrust plate 452. Here, in the bearing mechanism 4, the outer circumferential projecting portion 421 is arranged to project toward the side mouth portion 546 to bring a portion of the lubricating oil 47 which has arrived at the side mouth portion 546 into contact with the outer circumferential projecting portion 421 so that the lubricating oil 47 can be easily directed into the vertical gap 551, the horizontal gap 552, and the lower seal gap 56.

When the sleeve portion 45 is in the stationary state, that is, in a situation in which the lower surface of the sleeve portion 45 and the upper surface of the lower opposing portion 42 are in axial contact with each other, a minimum radial distance 72 between the outer circumferential surface of the lower thrust plate 452 and the inner circumferential surface of the outer circumferential projecting portion 421, and a minimum axial distance 73 between a lower surface of the lower portion of the sleeve body 451 and the upper surface of the outer circumferential projecting portion 421, are both preferably equal to or shorter than the axial width 71 of a radially outer mouth portion of the lower horizontal communicating channel 542. More preferably, in a section including the central axis J1, a straight line 76 which joins an outer edge of the lower surface of the lower thrust plate 452 and an outer edge of the lower surface of the lower portion of the sleeve body 451 crosses the outer circumferential projecting portion 421. This enables the filling of the lubricating oil 47 to be achieved more easily. Note that it is assumed here that the "outer edge of the lower surface" does not include a chamfer portion.

The above-described structure is particularly suitable for the case where an upper portion of an outer circumferential portion of the sleeve portion 45 is arranged to spread radially outward beyond the lower seal portion 56a, making it practically impossible to inject the lubricating oil 47 through the lower seal portion 56a.

Figure 11:
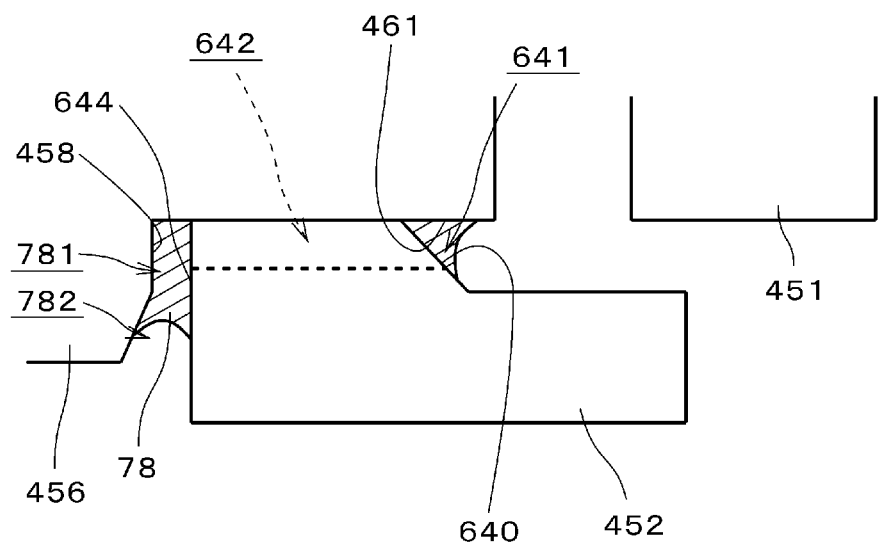
FIG. 11 is a diagram illustrating the lower thrust plate and its vicinity in a simplified form.

FIG. 11 is a diagram illustrating the lower thrust plate 452 and its vicinity in an enlarged form. The lower thrust plate 452 is preferably adhered to the sleeve body 451 through an adhesive 78. Use of the adhesive 78 makes it possible to fit the lower thrust plate 452 to the lower projecting portion 456 in a clearance-fit condition, eliminating or substantially minimizing the possibility that deformation of the lower thrust plate 452 will be caused, such as is the case with press fitting. After the adhesive 78 is applied to the lower surface of the sleeve body 451 or the upper surface of the lower thrust plate 452, the lower thrust plate 452 is attached to the sleeve body 451. The adhesive 78 is arranged in at least a portion of an inside of each adhesive groove 642 of the lower thrust plate 452. The adhesive grooves 642 enable the adhesive 78, which is applied in a circumferential direction, to be easily spread radially. As a result, a sufficient adhesive strength is secured. The adhesive 78 is preferably, for example, a thermosetting adhesive, and exhibits a decrease in viscosity before hardening of the adhesive 78 through heating occurs.

The adhesive 78 normally runs slightly off a radially outer end portion of each adhesive groove 642. A height changing surface 640 of the height changing portion 641 of the lower thrust plate 452 is angled radially inward with increasing height. A portion of the adhesive 78 which has run off the radially outer end portion of each adhesive groove 642 is preferably held between the height changing surface 640 and the lower annular surface 461 of the sleeve body 451. If the height changing portion 641 were defined by a shoulder not including a slanting surface, a portion of the adhesive 78 which has run off a radially outer edge of the radially inner portion of the upper surface of the lower thrust plate 452 might become unevenly distributed in the circumferential direction. If this happens, unbalanced load resistance of the bearing mechanism 4 becomes uneven in the circumferential direction. However, when the height changing surface 640 is a slanting surface, the portion of the adhesive 78 which has run off the radially outer edge of the radially inner portion of the upper surface of the lower thrust plate 452 easily becomes evenly distributed in the circumferential direction, and even unbalanced load resistance and stabilized quality of the bearing mechanism 4 are achieved. In addition, the amount of the adhesive applied can be increased to improve the unbalanced load resistance.

Moreover, a sufficient rigidity of the lower thrust plate 452 is preferably easily secured by the height changing portion 641 including the height changing surface 640 as a slanting surface arranged between the radially inner portion and the radially outer portion of the upper surface of the lower thrust plate 452 which are arranged, respectively, radially inside and radially outside the height changing portion 641. In particular, a sufficient rigidity of the lower thrust plate 452 against an unbalanced load on the motor 12 is easily secured thereby. The thickness of the lower thrust plate 452 cannot be much increased because of a constraint on the axial dimension of the bearing mechanism 4. Therefore, an improvement in the rigidity of the lower thrust plate 452 by the slant of the height changing surface 640 is important.

A portion of the adhesive 78 which has run off a radially inner edge of each adhesive groove 642 is arranged between an outer circumferential surface 458 of the lower projecting portion 456 and an inner circumferential surface 644 of the lower thrust plate 452. A gap defined between the outer circumferential surface 458 of the lower projecting portion 456 and the inner circumferential surface 644 of the lower thrust plate 452 will be hereinafter referred to as a "vertical adhesive gap 781". A lower portion of the outer circumferential surface 458 is a slanting surface angled radially inward with decreasing height. The adhesive 78 is thus held stably. That is, a lower portion of the vertical adhesive gap 781 preferably includes an adhesive holding gap 782 whose radial width gradually increases with decreasing height.

The inner circumferential surface 644 of the lower thrust plate 452 may be angled radially outward with decreasing height. That is, at the adhesive holding gap 782, the outer circumferential surface 458 of the lower projecting portion 456 is arranged to be angled radially inward with decreasing height, while the inner circumferential surface 644 of the lower thrust plate 452 is parallel or substantially parallel to the central axis J1 or to be angled radially outward with decreasing height. Moreover, at the adhesive holding gap 782, an angle defined by the outer circumferential surface 458 of the lower projecting portion 456 with the central axis J1 is preferably greater than an angle defined by the inner circumferential surface 644 of the lower thrust plate 452 with the central axis J1. This arrangement makes it possible to easily secure a sufficient size of the lower thrust dynamic pressure bearing portion 52*a* while defining the adhesive holding gap 782.

Figure 12:
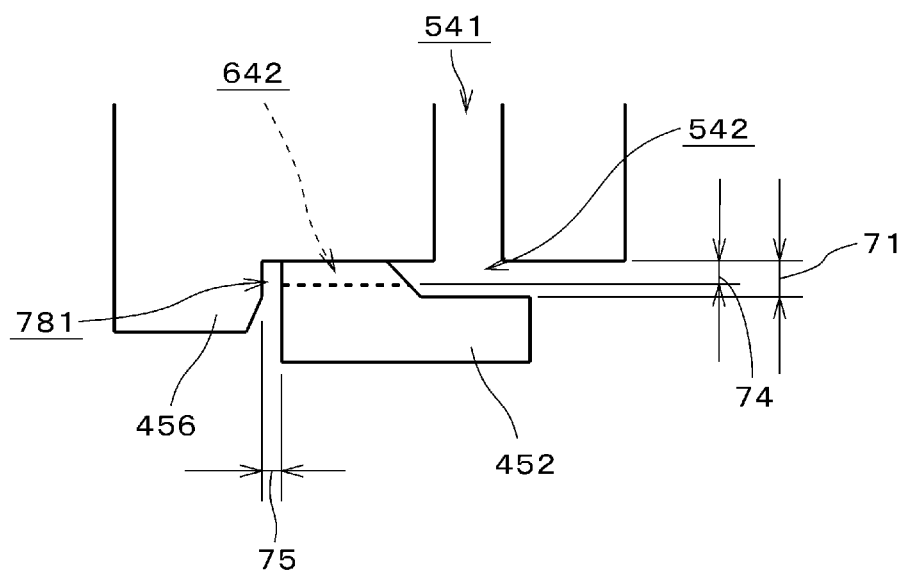
FIG. 12 is a diagram illustrating the lower thrust plate and its vicinity in a simplified form.

Referring to FIG. 12, the axial depth 74 of each adhesive groove 642 is preferably smaller than the axial width 71 of the lower horizontal communicating channel 542. A minimum radial width 75 of the vertical adhesive gap 781 is also preferably smaller than the width 71. This arrangement enables a portion of the adhesive 78 which has run into the lower horizontal communicating channel 542 to be drawn into the adhesive grooves 642 and the vertical adhesive gap 781 through capillary action, preventing the adhesive 78 from closing the vertical communicating channel 541. Note that the number of adhesive grooves 642 may be only one, if so desired. The minimum radial width 75 is actually very minute, and the position of the lower thrust plate 452 in the direction perpendicular or substantially perpendicular to the central axis J1 is easily determined as a result of the lower projecting portion 456 being inserted in the lower thrust plate 452 as described above. The same is also true of the upper thrust plate 453. This enables the thrust dynamic pressure bearing portion to easily have a large size.

Figure 13:
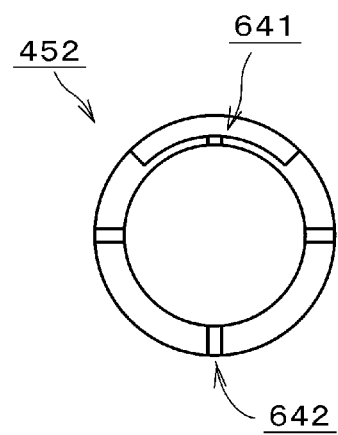
FIG. 13 is a plan view of a lower thrust plate according to a modification of the above preferred embodiment.

FIG. 13 is a plan view of a lower thrust plate 452 according to a modification of the above-described preferred embodiment of the present invention. The lower thrust plate 452 illustrated in FIG. 13 includes a height changing portion 641 arranged to extend over only a portion of its circumferential extent. That is, only a portion of an outer edge portion of the lower thrust plate 452 which extends over only a portion of its circumferential extent is recessed downward. The lower thrust plate 452 illustrated in FIG. 13 is otherwise similar in structure to the lower thrust plate 452 illustrated in FIG. 8. When the bearing mechanism 4 is assembled, the lower thrust plate 452 is preferably attached to the lower portion of the sleeve body 451 such that a portion of an upper surface of the lower thrust plate 452 which is arranged radially outside the height changing portion 641 axially overlaps with the lower mouth portion 544 of the vertical communicating channel 541.

Figure 14:
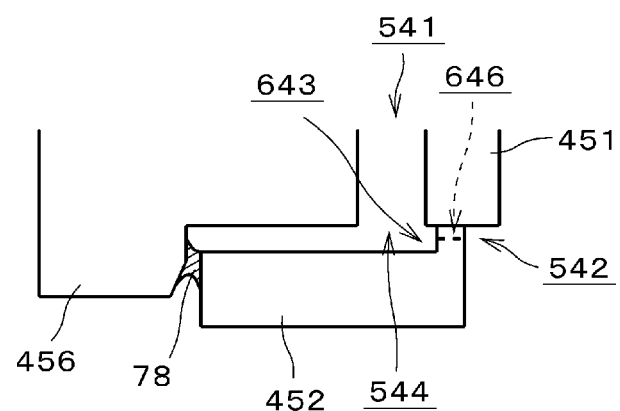
FIG. 14 is a cross-sectional view of a lower thrust plate according to another modification of the above preferred embodiment.

FIG. 14 is a cross-sectional view of a lower thrust plate 452 according to another modification of the above-described preferred embodiment of the present invention. An upper surface of the lower thrust plate 452 illustrated in FIG. 14 preferably includes a height changing portion 643. A portion (hereinafter referred to as a "radially inner portion") of the upper surface of the lower thrust plate 452 which is arranged radially inside the height changing portion 643 is preferably arranged at an axial height lower than an axial height of a portion (hereinafter referred to as a "radially outer portion") of the upper surface of the lower thrust plate 452 which is arranged radially outside the height changing portion 643. In addition, at least a portion of the radially inner portion of the upper surface of the lower thrust plate 452 is arranged to axially overlap with the lower mouth portion 544 of the vertical communicating channel 541. The upper surface of the lower thrust plate 452 preferably includes a groove 646 arranged to extend from the height changing portion 643 to an outer circumferential surface of the lower thrust plate 452. The groove 646 and the lower surface of the sleeve body 451 are arranged to together define a lower horizontal communicating channel 542 therebetween as a result of the lower thrust plate 452 being attached to the sleeve body 451. A gap between the outer circumferential surface of the lower projecting portion 456 of the sleeve body 451 and an inner circumferential surface of the lower thrust plate 452 is preferably sealed with the adhesive 78. The above-described structure also enables the lower horizontal communicating channel 542 to be easily defined.

Note that a depressed portion of the upper surface of the lower thrust plate 452, which is positioned at an axial height lower than an axial height of another portion of the upper surface of the lower thrust plate 452, may be defined in a variety of shapes as long as the depressed portion axially overlaps with the lower mouth portion 544 of the vertical communicating channel 541. For example, the depressed portion may be defined in a radially middle portion of the lower thrust plate 452. In this case, another recessed portion, such as, for example, a groove, extending from the depressed portion to the outer circumferential surface of the lower thrust plate 452 may be defined to define the lower horizontal communicating channel 542 in the sleeve portion 45.

Figure 15:
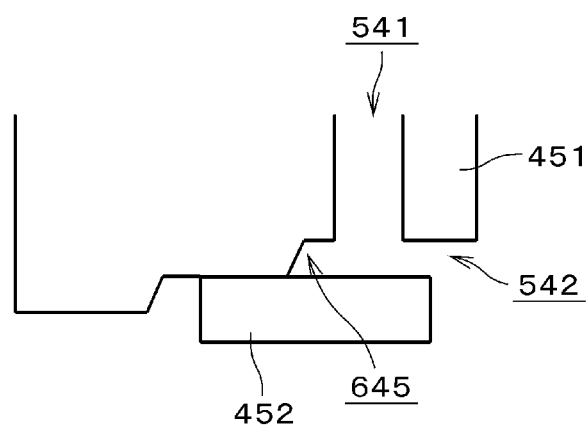
FIG. 15 is a diagram illustrating a lower thrust plate and a sleeve body according to a modification of the above preferred embodiment.

FIG. 15 is a diagram illustrating a lower thrust plate 452 and a sleeve body 451 according to another modification of the above-described preferred embodiment of the present invention. In the modification illustrated in FIG. 15, a lower surface of the sleeve body 451 preferably includes a height changing portion 645. A portion (hereinafter referred to as a "radially outer portion") of the lower surface of the sleeve body 451 which is arranged radially outside the height changing portion 645 is arranged at an axial height higher than an axial height of a portion (hereinafter referred to as a "radially inner portion") of the lower surface of the sleeve body 451 which is arranged radially inside the height changing portion 645. The height changing portion 645 may be either defined only in the vicinity of a lower mouth portion of a vertical communicating channel 541, or arranged to extend over an entire circumferential extent of the lower surface of the sleeve body 451. An upper surface of the lower thrust plate 452 is flat. An adhesive groove extending in the radial direction may be defined in the upper surface of the lower thrust plate 452. A lower horizontal communicating channel 542 extending radially is defined in between the radially outer portion, i.e., the portion of the lower surface of the sleeve body 451 which is arranged radially outside the height changing portion 645, and the upper surface of the lower thrust plate 452 as a result of the lower thrust plate 452 being attached to a lower portion of the sleeve body 451. Also in the modification illustrated in FIG. 15, the lower horizontal communicating channel 542 can be easily defined. Moreover, according to the modification illustrated in FIG. 15, simplification of the shape of the lower thrust plate 452 is achieved.

Figure 16:
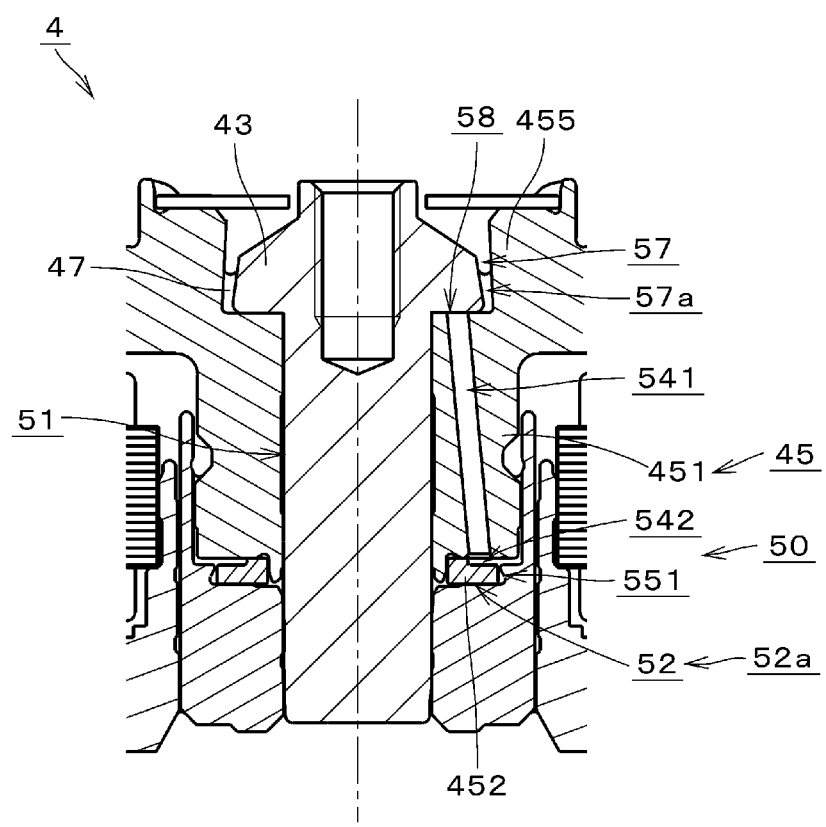
FIG. 16 is a cross-sectional view of a bearing mechanism according to a modification of the above preferred embodiment.
Figure 17:
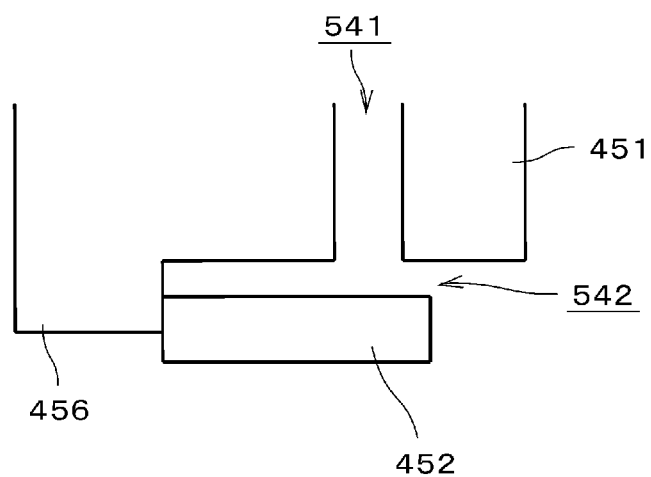
FIG. 17 is a cross-sectional view of a lower thrust plate according to a modification of the above preferred embodiment.

FIG. 16 is a diagram illustrating a bearing mechanism 4 according to a modification of the above-described preferred embodiment of the present invention. The bearing mechanism 4 illustrated in FIG. 16 preferably does not include an upper thrust dynamic pressure bearing portion. The bearing mechanism 4 illustrated in FIG. 16 is otherwise similar in structure to the bearing mechanism 4 illustrated in FIG. 3. Accordingly, members or portions that have their equivalents in FIG. 3 are denoted by the same reference numerals as those of their equivalents in FIG. 3.

In the bearing mechanism 4 illustrated in FIG. 16, a vertical communicating channel 541 is preferably angled radially inward with increasing height. An upper surface of a sleeve body 451 is arranged opposite to a lower surface of an upper opposing portion 43. Hereinafter, a gap defined between the upper surface of the sleeve body 451 and the lower surface of the upper opposing portion 43 will be referred to as an "upper thrust gap 58". That is, the lower surface of the upper opposing portion 43 is arranged axially opposite to an upper end surface of a sleeve portion 45 with the upper thrust gap 58 intervening therebetween. Note that the upper thrust gap 58 is preferably a simple gap, and is not arranged to define the upper thrust dynamic pressure bearing portion.

An upper mouth portion of the vertical communicating channel 541 is arranged to axially overlap with the lower surface of the upper opposing portion 43. An upper seal gap 57 is preferably defined between an outer circumferential surface of the upper opposing portion 43 and an inner circumferential surface of an upper outer annular portion 455. A lubricating oil 47 is held in the upper seal gap 57, and an upper seal portion 57a is defined therein. The upper seal portion 57a is angled radially inward with increasing height. This enables any air bubble generated in the lubricating oil 47 to be efficiently discharged out of the upper seal portion 57a. The vertical communicating channel 541 is essentially continuous with the upper seal gap 57 as well. Also in the bearing mechanism 4 illustrated in FIG. 16, as in the bearing mechanism 4 illustrated in FIG. 3, the vertical communicating channel 541 is preferably continuous with an upper portion of a radial gap 51.

A magnetic force is used to apply a downward force to the sleeve portion 45. The sleeve portion 45 is axially supported only by a lower thrust dynamic pressure bearing portion 52a. A circulation channel 50 including, as main portions thereof, a lower thrust gap 52, the radial gap 51, the upper thrust gap 58, the vertical communicating channel 541, a lower horizontal communicating channel 542, and a vertical gap 551 is defined in a manner similar to that in which the circulation channel 50 illustrated in FIG. 3 is defined. The circulation channel 50 is filled with the lubricating oil 47. The circulation channel 50 and the upper seal gap 57 are arranged to be in communication with each other, and the circulation channel 50 and the upper seal gap 57 are filled with the lubricating oil 47. An outer circumferential portion of the upper thrust gap 58 is preferably joined to the upper seal gap 57. The lubricating oil 47 is caused to flow downward in the radial gap 51 of the circulation channel 50 during rotation of the sleeve portion 45.

The structures of a lower thrust plate 452 and its vicinity and a manner of filling of the lubricating oil 47 are preferably similar to those in the case of the above-described preferred embodiment illustrated in FIG. 3 or a modification thereof. The filling of the lubricating oil 47 is thus accomplished easily.

FIGS. 17, 18, 19, 20, 21, 22, and 23 are diagrams illustrating a lower thrust plate 452 according to modifications of the above-described preferred embodiment. The upper thrust plate 453 may also be modified in a manner similar to that of any of the lower thrust plates 452 according to these modifications, the modification illustrated in FIG. 15, and yet other modifications described below. The lower thrust plate 452 illustrated in FIG. 17 preferably does not include a height changing portion 641. The lower projecting portion 456 of the sleeve body 451 is preferably, for example, press fitted to the lower thrust plate 452. The lower thrust plate 452 may alternatively be fixed to the lower projecting portion 456 through an adhesive. The lower horizontal communicating channel 542 can be defined by the above structure as well.

Figure 18:
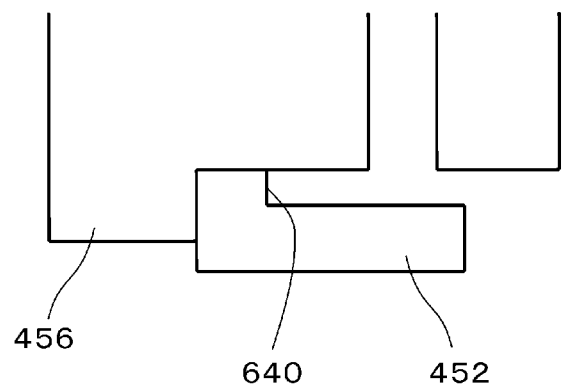
FIG. 18 is a cross-sectional view of a lower thrust plate according to a modification of the above preferred embodiment.

The lower thrust plate 452 illustrated in FIG. 18 preferably includes a height changing surface 640 parallel or substantially parallel to the central axis J1. The height changing surface 640 may not necessarily be a slanting surface, as in this modification. Although an inner circumferential surface of the lower thrust plate 452 and the outer circumferential surface of the lower projecting portion 456 are in contact with each other in FIG. 18, the inner circumferential surface of the lower thrust plate 452 and the outer circumferential surface of the lower projecting portion 456 may be slightly spaced from each other, as described above. The same is true of other similar figures. An outer circumferential portion of the lower thrust plate 452 according to the modification illustrated in FIG. 18 may be arranged to include the height changing portion 643 and the groove 646 as illustrated in FIG. 14.

Figure 19:
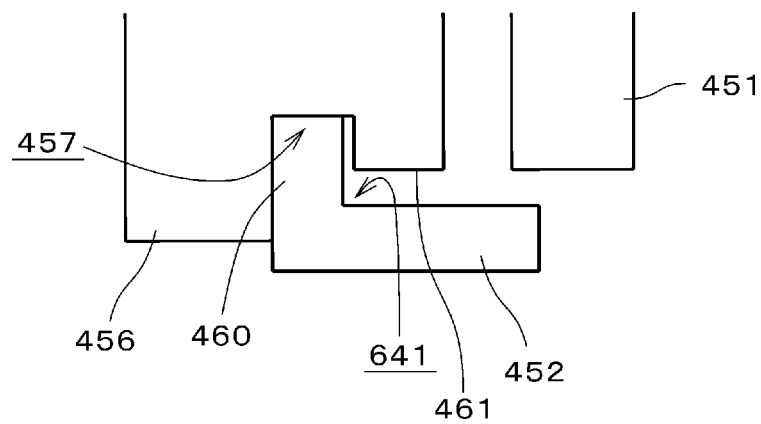
FIG. 19 is a cross-sectional view of a lower thrust plate according to a modification of the above preferred embodiment.

In the lower thrust plate 452 illustrated in FIG. 19, a portion of the lower thrust plate 452 which is arranged radially inside a height changing portion 641 is arranged inside a sleeve body 451. Specifically, the sleeve body 451 preferably includes a body recessed portion 457, whereas the lower thrust plate 452 includes a plate projecting portion 460 arranged to project into the body recessed portion 457. The body recessed portion 457 is annular and centered on the central axis J1, and is recessed in the axial direction inside of a lower annular surface 461. The plate projecting portion 460 is also annular, and is arranged to project into the body recessed portion 457 around an inner circumferential surface of the lower thrust plate 452. The lower thrust plate 452 illustrated in FIG. 19 is otherwise similar in structure to the lower thrust plate 452 illustrated in FIG. 18.

Figure 20:
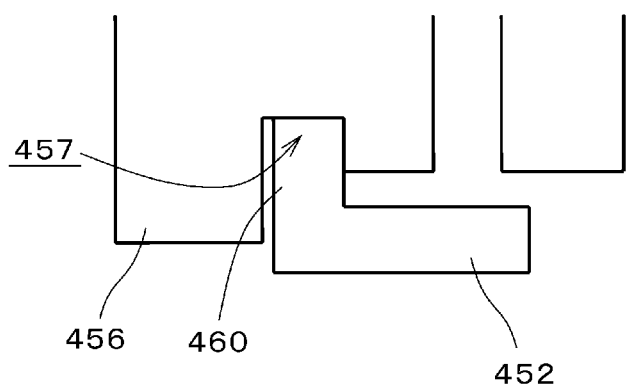
FIG. 20 is a cross-sectional view of a lower thrust plate according to a modification of the above preferred embodiment.

In the modification illustrated in FIG. 19, the position of the lower thrust plate 452 in the direction perpendicular or substantially perpendicular to the central axis J1 is determined as a result of an outer circumferential surface of a lower projecting portion 456 and the inner circumferential surface of the lower thrust plate 452 being brought into direct contact with each other or into indirect contact with each other with an adhesive or another member intervening therebetween, as in the case of the modification illustrated in FIG. 18. However, referring to FIG. 20, the position of the lower thrust plate 452 in the direction perpendicular or substantially perpendicular to the central axis J1 may be determined as a result of an outer circumferential surface of the plate projecting portion 460 and a radially outer side surface of the body recessed portion 457 being brought into direct radial contact with each other or into indirect radial contact with each other with another member intervening therebetween. Even in this case, the lower thrust plate 452 is preferably fixed to the lower projecting portion 456 through, for example, an adhesive or through press fitting. The lower thrust plate 452 illustrated in FIG. 20 is otherwise similar in structure to the lower thrust plate 452 illustrated in FIG. 19.

Figure 21:
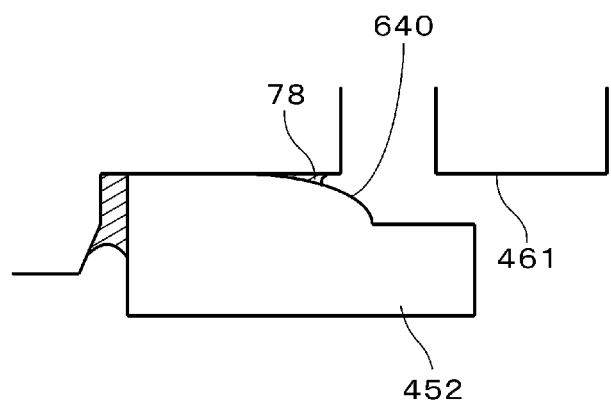
FIG. 21 is a cross-sectional view of a lower thrust plate according to a modification of the above preferred embodiment.
Figure 22:
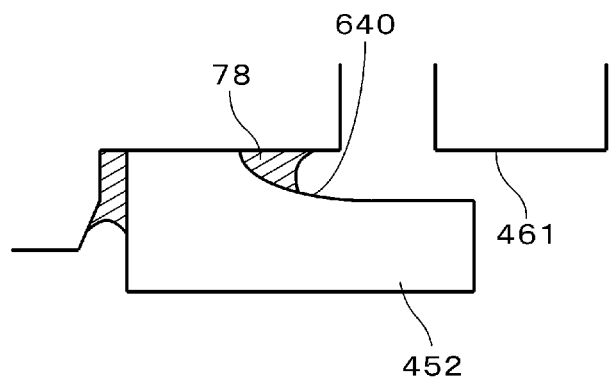
FIG. 22 is a cross-sectional view of a lower thrust plate according to a modification of the above preferred embodiment.

The lower thrust plate 452 illustrated in FIG. 21 preferably includes a height changing surface 640 that is convex to the lower annular surface 461. In FIG. 21, an adhesive 78 is indicated by parallel oblique lines. The same is true of FIGS. 22 and 23. The height changing surface 640 is arranged to become gradually more distant from the lower annular surface 461 in the axial direction with increasing distance from the central axis J1. To be more precise, the height changing surface 640 preferably has a section substantially in the shape of a circular arc. The lower thrust plate 452 illustrated in FIG. 22 preferably includes a height changing surface 640 that is concave relative to the lower annular surface 461. The height changing surface 640 is arranged to become gradually more distant from the lower annular surface 461 in the axial direction with increasing distance from the central axis J1. To be more precise, the height changing surface 640 preferably has a section substantially in the shape of a circular arc. As described above, the shape of the height changing surface 640 may be modified in a variety of manners in accordance with a desired amount of the adhesive 78 to be held between the height changing surface 640 and the lower annular surface 461.

Figure 23:
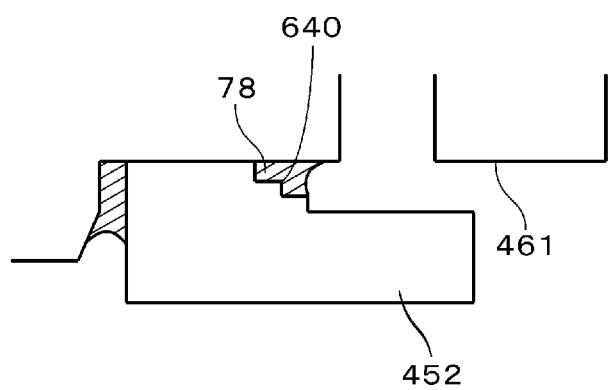
FIG. 23 is a cross-sectional view of a lower thrust plate according to a modification of the above preferred embodiment.

The lower thrust plate 452 illustrated in FIG. 23 preferably includes a height changing surface 640 arranged to cause changes in height through a plurality of shoulders. In FIG. 23, the height changing surface 640 is arranged to become more distant from the lower annular surface 461 a plurality of times at regular intervals with increasing distance from the central axis J1. The height changing surface 640 having this shape contributes to securing a sufficient rigidity of the lower thrust plate 452, and enabling the adhesive 78 to be easily held.

Figure 24:
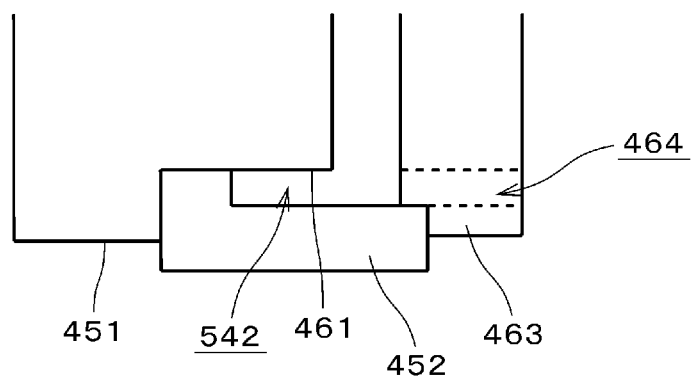
FIG. 24 is a diagram illustrating a lower thrust plate and a sleeve body according to a modification of the above preferred embodiment.

FIG. 24 is a diagram illustrating a lower thrust plate 452 and a sleeve body 451 according to a modification of the above-described preferred embodiment. The lower thrust plate 452 is similar to the lower thrust plate 452 illustrated in FIG. 18. A radially outer portion of the sleeve body 451 preferably includes an outer projecting portion 463 arranged to project from a lower annular surface 461 toward the lower thrust plate 452. The outer projecting portion 463 is arranged to be in axial contact with an outer edge portion of the lower thrust plate 452. The outer projecting portion 463 includes a horizontal through hole 464 passing radially therethrough. A sleeve portion 45 according to this modification is otherwise similar in structure to a sleeve portion according to the modification illustrated in FIG. 18. The outer edge portion of the lower thrust plate 452 is axially supported by the outer projecting portion 463. Meanwhile, the horizontal through hole 464 is arranged to connect a lower horizontal communicating channel 542 with a lower seal gap.

Figure 25:
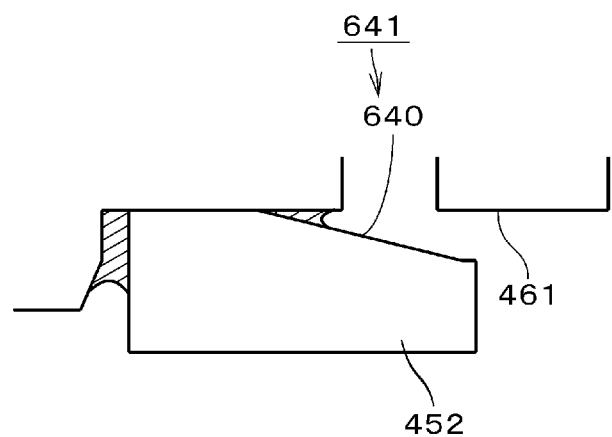
FIG. 25 is a cross-sectional view of a lower thrust plate according to a modification of the above preferred embodiment.

FIG. 25 is a diagram illustrating a lower thrust plate 452 according to another modification of the above-described preferred embodiment. The lower thrust plate 452 preferably includes a height changing surface 640 arranged to become gradually more distant from the lower annular surface 461 with increasing distance from the central axis J1. The height changing surface 640 has a large radial width. A portion of an upper surface of the lower thrust plate 452 which is arranged radially outside a height changing portion 641 is extremely small. Note that the height changing surface 640 may be arranged to extend up to an outer circumferential edge of the lower thrust plate 452.

The structures of the lower thrust plates 452 and the sleeve bodies 451 according to the modifications illustrated in FIGS. 17 to 25 are also applicable to upper thrust plates according to other preferred embodiments of the present invention described below. That is, to express in general terms, a thrust plate is fixed to an end portion of a sleeve body on one of upper and lower sides, and an opposing portion is arranged to extend radially outward from an end portion of a shaft portion on the one of the upper and lower sides, and includes a surface arranged axially opposite to an end surface of a sleeve portion on the one of the upper and lower sides with a thrust gap defined therebetween.

Figure 26:
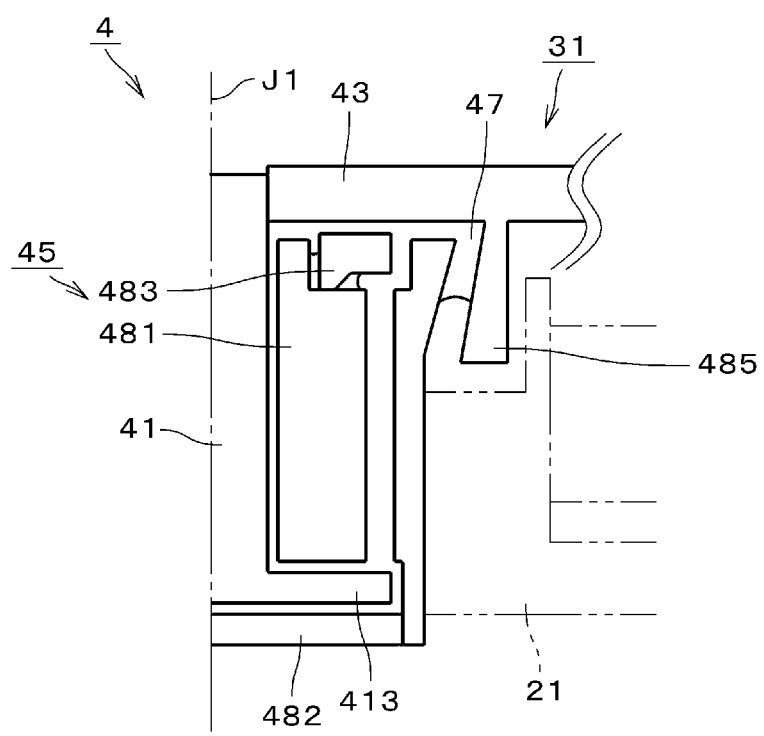
FIG. 26 is a cross-sectional view of a bearing mechanism according to a modification of the above preferred embodiment.

FIG. 26 is a diagram illustrating a bearing mechanism 4 used in a disk drive apparatus 1 and a motor 12 according to a modification of the above-described preferred embodiment. The disk drive apparatus 1 and the motor 12 are substantially similar in structure to those illustrated in FIG. 1 except in the bearing mechanism 4. The bearing mechanism 4 includes a shaft-rotating structure. In FIG. 26, parallel oblique lines for sections are omitted, and components arranged around the bearing mechanism 4 are represented by chain double-dashed lines.

The bearing mechanism 4 preferably includes a shaft portion 41, an upper opposing portion 43, an upper outer annular portion 485, a sleeve portion 45, and a lubricating oil 47. Each of the upper opposing portion 43 and the upper outer annular portion 485 is a portion of a rotor hub 31. The shaft portion 41 is centered on a central axis J1 extending in the vertical direction. The shaft portion 41 includes a cylindrical outer circumferential surface. The shaft portion 41 is preferably, for example, press fitted to a center of the rotor hub 31. The upper opposing portion 43 is arranged above the sleeve portion 45. The upper opposing portion 43 is arranged axially opposite to the sleeve portion 45. The upper outer annular portion 485 is arranged to extend downward from an outer circumference of the upper opposing portion 43 in the vicinity of an outer circumference of the sleeve portion 45. A shaft plate 413 is arranged at a lower end of the shaft portion 41. The shaft plate 413 is arranged to extend radially outward in the shape of a disk at the lower end of the shaft portion 41.

The sleeve portion 45 is fixed to a base plate 21. The shaft portion 41 is rotatable about the central axis J1 with respect to the sleeve portion 45. The sleeve portion 45 preferably includes a sleeve body 481, a seal cap 482, and an upper thrust plate 483. The sleeve body 481 is substantially cylindrical and is centered on the central axis J1. The sleeve body 481 preferably includes a through hole in which the shaft portion 41 is accommodated. The seal cap 482 is substantially in the shape of a disk, and is arranged to close a bottom opening of the sleeve body 481. The shaft plate 413 is accommodated in a space defined between the seal cap 482 and the sleeve body 481.

The upper thrust plate 483 is arranged on an upper side of the sleeve body 481. The structures of the upper thrust plate 483 and its vicinity of the bearing mechanism 4 are substantially the same as the structures of the lower thrust plate 452 and its vicinity illustrated in FIG. 10 turned upside down.

Figure 27:
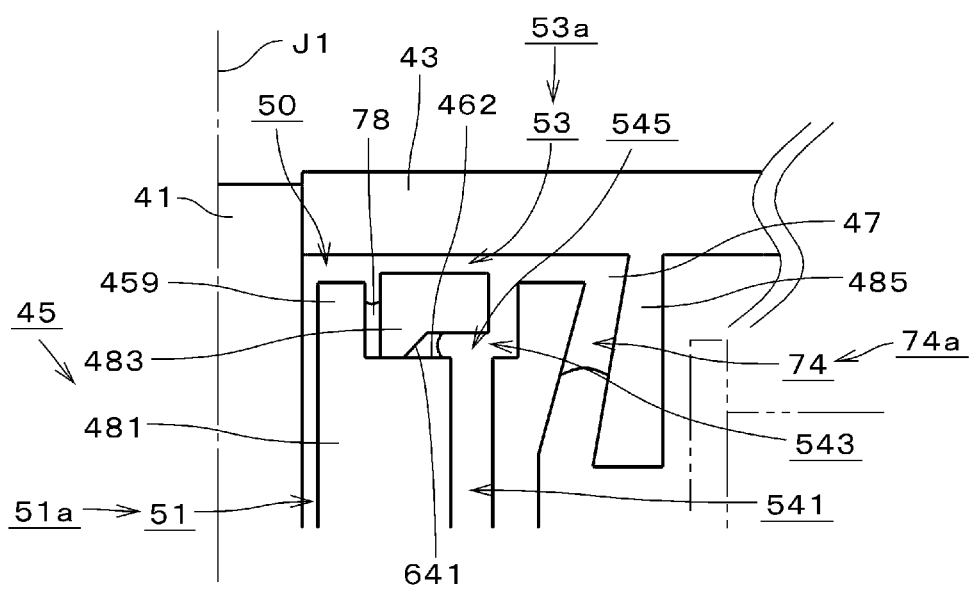
FIG. 27 is an enlarged view of the bearing mechanism according to the above modification of the above preferred embodiment.

The upper thrust plate 483 is preferably similar to the lower thrust plate 452 illustrated in FIG. 8. Accordingly, reference will be appropriately made to reference numerals used for the lower thrust plate 452. FIG. 27 is a cross-sectional view illustrating the upper thrust plate 483 and its vicinity in an enlarged form. The upper thrust plate 483 is annular and centered on the central axis J1. The upper thrust plate 483 is fixed to an upper end portion of the sleeve body 481. The sleeve body 481 includes an upper annular surface 462 and an upper projecting portion 459, which is a body projecting portion. The upper annular surface 462 is arranged opposite to a lower surface of the upper thrust plate 483. The upper annular surface 462 is arranged to extend radially around the central axis J1. The upper projecting portion 459 is annular. The upper projecting portion 459 is arranged to project in the axial direction inside of the upper annular surface 462.

The lower surface of the upper thrust plate 483 includes a height changing portion 641. The height changing portion 641 is arranged to extend over an entire circumferential extent of the lower surface of the upper thrust plate 483. A portion (hereinafter referred to as a "radially outer portion") of the lower surface of the upper thrust plate 483 which is arranged radially outside the height changing portion 641 is arranged at an axial height higher than an axial height of a portion (hereinafter referred to as a "radially inner portion") of the lower surface of the upper thrust plate 483 which is arranged radially inside the height changing portion 641. That is, the radially outer portion is arranged axially farther away from the upper annular surface 462 than the radially inner portion. As in the case of the lower thrust plate 452 illustrated in FIG. 11, a height changing surface of the height changing portion 641 is a slanting surface such that an improvement in rigidity of the upper thrust plate 483 and stable holding of an adhesive 78 are achieved. The radially inner portion of the lower surface of the upper thrust plate 483 includes a plurality of adhesive grooves each of which is arranged to extend in the radial direction.

The upper projecting portion 459 is arranged inside of the upper thrust plate 483. An outer circumferential surface of the upper projecting portion 459 and an inner circumferential surface of the upper thrust plate 483 are arranged to be in indirect contact with each other through the adhesive 78. The upper projecting portion 459 may be press fitted in the upper thrust plate 483. That is, the outer circumferential surface of the upper projecting portion 459 and the inner circumferential surface of the upper thrust plate 483 are arranged to be in direct contact with each other or in indirect contact with each other with another member intervening therebetween. The position of the upper thrust plate 483 in the direction perpendicular to the central axis J1 is thus easily determined.

A lower surface of the upper opposing portion 43 is arranged to extend radially outward from an upper end portion of the shaft portion 41, and is arranged axially opposite to an upper end surface of the sleeve portion 45 with an upper thrust gap 53 defined therebetween. The upper thrust gap 53 preferably includes an upper thrust dynamic pressure bearing portion 53a defined therein. A radial gap 51 is defined between the outer circumferential surface of the shaft portion 41 and an inner circumferential surface of the sleeve portion 45, and the radial gap 51 includes a radial dynamic pressure bearing portion 51a defined therein.

The axial width of the upper thrust gap 53 is preferably smaller than the axial width of a gap defined between the upper projecting portion 459 and the upper opposing portion 43. A thrust dynamic pressure is thus obtained stably. The same is true of other preferred embodiments of the present invention described below. The "width of the upper thrust gap 53" mentioned here refers to the width of the upper thrust gap 53 when the motor 12 is rotating at a constant rotational speed. When the motor 12 is in a stopped state, the upper thrust gap 53 may be nonexistent, that is, the upper thrust plate 483 and the upper opposing portion 43 may be in contact with each other. The same holds true in the following description as well. In the present modification of the above-described preferred embodiment, an upper end surface of the upper projecting portion 459 is arranged at an axial height lower than an axial height of an upper surface of the upper thrust plate 483, and the lower surface of the upper opposing portion 43 is flat.

The sleeve portion 45 preferably includes a vertical communicating channel 541 and an upper horizontal communicating channel 543. The vertical communicating channel 541 and the upper horizontal communicating channel 543 correspond to the vertical communicating channel 541 and the lower horizontal communicating channel 542, respectively, illustrated in FIG. 3. That is, in FIG. 27, the vertical communicating channel 541 is the first communicating channel, while the upper horizontal communicating channel 543 is the second communicating channel.

The vertical communicating channel 541 preferably includes an upper mouth portion 545 arranged to be open in the upper annular surface 462. The vertical communicating channel 541 is arranged to be in indirect communication with a lower end portion of the radial gap 51. The upper horizontal communicating channel 543 is defined between the sleeve body 481 and the upper thrust plate 483. To be more precise, the upper horizontal communicating channel 543 is defined between the upper annular surface 462 of the sleeve body 451 and the radially outer portion, i.e., the portion of the lower surface of the upper thrust plate 483 which is arranged radially outside the height changing portion 641. At least a portion of the radially outer portion is arranged axially opposite to the upper mouth portion 545. The upper horizontal communicating channel 543 is thus easily defined. In the present modification of the above-described preferred embodiment, the entire upper mouth portion 545 is arranged axially opposite to the radially outer portion of the lower surface of the upper thrust plate 483.

A difference between the axial width of the upper thrust gap 53 and the axial width of the gap defined between the upper projecting portion 459 and the upper opposing portion 43 is preferably greater than the depth of each dynamic pressure groove of the upper thrust dynamic pressure bearing portion 53a and smaller than the axial width of the upper horizontal communicating channel 543. The thrust dynamic pressure is thus obtained more stably.

The radially inner portion of the lower surface of the upper thrust plate 483 is arranged to be in axial contact with the upper annular surface 462. Both the axial position of the upper thrust plate 483 and the axial width of the upper horizontal communicating channel 543 are thus easily determined.

An inner circumferential surface of the upper outer annular portion 485 preferably is cylindrical or substantially cylindrical and is arranged to surround at least a portion of an outer circumferential surface of the sleeve portion 45. The position of the upper outer annular portion 485 relative to the upper opposing portion 43 is fixed. A portion of an upper seal gap 74 is defined between the outer circumferential surface of the sleeve portion 45 and the inner circumferential surface of the upper outer annular portion 485. The upper seal gap 74 is continuous with an outer circumferential portion of the upper thrust gap 53. The upper seal gap 74 includes an upper seal portion 74a defined therein. The upper seal portion 74a is thus easily defined. The upper horizontal communicating channel 543 preferably defines at least a portion of a channel extending from the upper mouth portion 545 to the upper seal gap 74. Although the position of the upper seal gap 74 may be modified in a variety of manners, it is preferable that the upper seal gap 74 should be arranged radially outward of the upper thrust dynamic pressure bearing portion 53a.

The upper thrust gap 53, the radial gap 51, a gap defined between an upper surface of the shaft plate 413 and a surface of the sleeve body 481 which is opposed to the upper surface of the shaft plate 413, the vertical communicating channel 541, the upper horizontal communicating channel 543, and so on together define a circulation channel 50. The circulation channel 50 and the upper seal gap 74 are arranged to be in communication with each other. The circulation channel 50 and the upper seal gap 74 are filled with the lubricating oil 47. Note that, in the case of the modification illustrated in FIG. 26, an upper end of the upper seal gap 74 is arranged on a lateral side of the upper thrust gap 53, unlike the structure of an area near the lower thrust plate 452 illustrated in FIG. 3.

The upper mouth portion 545 is arranged to axially overlap with the upper thrust dynamic pressure bearing portion 53a. This enables the upper thrust dynamic pressure bearing portion 53a to be increased in size without avoiding the upper mouth portion 545.

Figure 28:
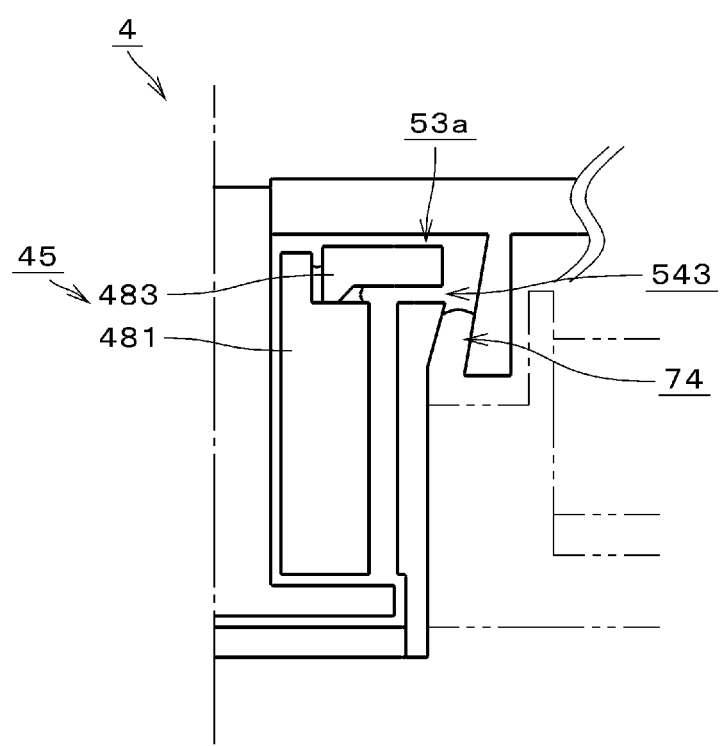
FIG. 28 is a cross-sectional view of a bearing mechanism according to a modification of the above preferred embodiment.

FIG. 28 is a diagram illustrating a bearing mechanism 4 according to another modification of the above-described preferred embodiment. In the bearing mechanism 4 illustrated in FIG. 28, an upper thrust plate 483 is arranged to extend up to a space positioned above an outer edge portion of a sleeve body 481. The bearing mechanism 4 illustrated in FIG. 28 is otherwise similar in structure to the bearing mechanism 4 illustrated in FIG. 26. In a sleeve portion 45, an upper horizontal communicating channel 543 is arranged to be open radially outwardly. This makes it easy to secure a sufficient size of an upper thrust dynamic pressure bearing portion 53a. In the case of the modification illustrated in FIG. 28, the upper horizontal communicating channel 543 is joined to an upper end of an upper seal gap 74, similarly to the structure illustrated in FIG. 7. The upper thrust plate 483 illustrated in FIG. 28, which is increased in size, may be adopted as the lower thrust plate 452 illustrated in FIG. 7.

In the case where the upper horizontal communicating channel 543 is arranged to be open radially outwardly in the sleeve portion 45, an outer circumferential surface of the upper thrust plate 483 is preferably arranged radially inward of an outer circumferential surface of the sleeve body 481. This makes it possible to easily prevent the upper thrust plate 483 from making contact with a member positioned outside thereof. The same is true of the case where a large thrust plate is adopted as the lower thrust plate 452 illustrated in FIG. 7.

Figure 29:
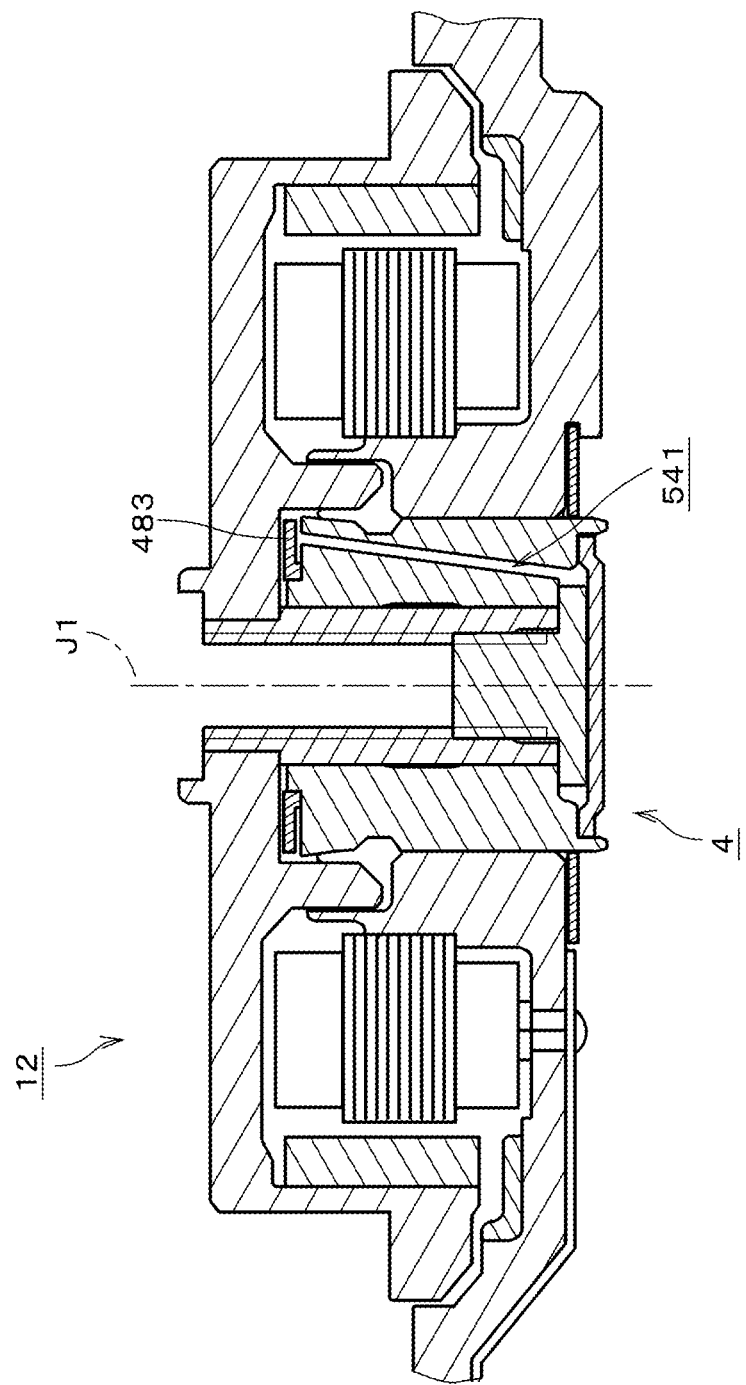
FIG. 29 is a cross-sectional view of a motor according to a modification of the above preferred embodiment.

FIG. 29 is a cross-sectional view illustrating a motor 12 including the bearing mechanism 4 as illustrated in FIG. 28 for use in a disk drive apparatus according to a specific preferred embodiment of the present invention. Note that, in FIG. 29, a vertical communicating channel 541 is preferably angled radially outward with increasing height, and a height changing surface of an upper thrust plate 483 is parallel or substantially parallel to a central axis J1. As described above, details of the structures of the bearing mechanisms 4 illustrated in FIGS. 26, 28, and so on may be modified in a variety of manners in accordance with processing, assemblage, surrounding structures, and so on.

Figure 30:
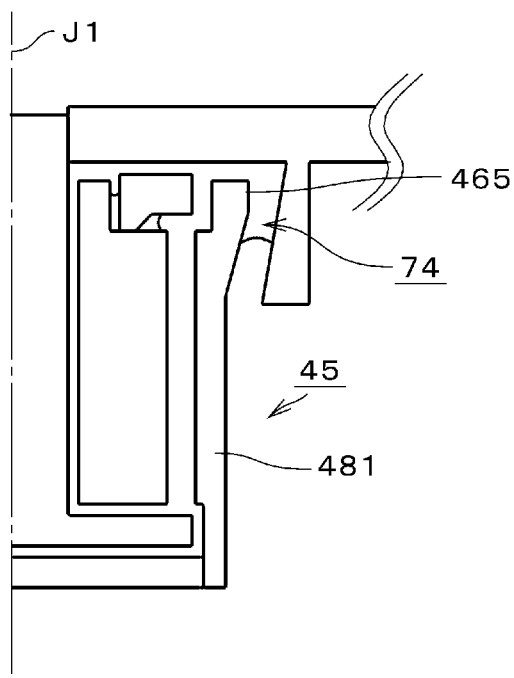
FIG. 30 is a cross-sectional view of a bearing mechanism according to a modification of the above preferred embodiment.
Figure 31:
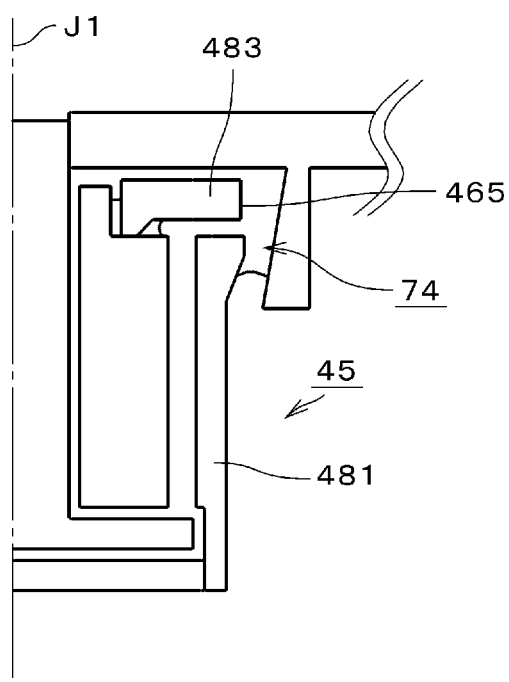
FIG. 31 is a cross-sectional view of a bearing mechanism according to a modification of the above preferred embodiment.

FIGS. 30 and 31 are diagrams illustrating modifications of the modifications illustrated in FIGS. 26 and 28, respectively, in which the outer circumferential surface of the sleeve portion 45 includes a cylindrical surface 465 centered on the central axis J1 at a portion of the upper seal gap 74. In FIG. 30, the cylindrical surface 465 is preferably arranged at an upper portion of the outer circumferential surface of the sleeve body 481. In FIG. 31, the cylindrical surface 465 is preferably arranged at the outer circumferential surface of the upper thrust plate 483 and the upper portion of the outer circumferential surface of the sleeve body 481. As in the modifications above, the outer circumferential surface of the sleeve body 481 may not necessarily be angled throughout the entire upper seal gap 74.

While the disk drive apparatuses 1, the motors 12, and the bearing mechanisms 4 according to preferred embodiments of the present invention and modifications thereof have been described above, it is to be understood that the present invention is not limited to the above-described preferred embodiments and modifications, and that a variety of additional modifications are possible.

For example, the radial dynamic pressure groove arrays may be defined in the outer circumferential surface of the shaft portion 41. Similarly, the lower thrust dynamic pressure groove array 621 may be defined in the lower surface of the lower thrust plate 452, and the upper thrust dynamic pressure groove array 622 may be defined in the lower surface of the upper opposing portion 43.

The inner circumferential surface of the lower thrust plate 452 and the inner circumferential surface of the upper thrust plate 453 or 483 may be fitted to the outer circumferential surface of the lower projecting portion 456 of the sleeve body 451 and the outer circumferential surface of the upper projecting portion 459, respectively, through, as described above, press fitting, a combination of press fitting and adhesion, welding, crimping, or the like. That is, the outer circumferential surfaces of the lower projecting portion 456 and the upper projecting portion 459 are arranged to be in direct contact with the inner circumferential surfaces of the lower thrust plate 452 and the upper thrust plate 453 or 483, respectively, or in indirect contact therewith with other members intervening therebetween. The other members are not limited to the adhesives. In the case of the modification illustrated in FIG. 20, the outer circumferential surface of the plate projecting portion 460 and the radially outer side surface of the body recessed portion 457 are arranged to be in direct contact with each other or in indirect contact with each other with another member intervening therebetween.

The lower seal portion 56a is not limited to a pumping seal. For example, the lower seal portion 56a may be arranged to have a structure similar to that of the upper seal portion 57a. The upper seal portion 57a may be a pumping seal.

The motor 12 may be an inner-rotor motor, for example. The motor 12 is usable not only in the hard disk drive apparatus, but also in other disk drive apparatuses, such as an optical disk drive apparatus, a magneto-optical disk drive apparatus, or the like, and also as a motor for applications other than the disk drive apparatuses. For example, the motor 12 is also usable as a polygon scanner motor of a laser beam printer, a color wheel drive motor of a projector, or the like.

In the motor illustrated in FIG. 29, a magnetic center of a stator is arranged at an axial height lower than an axial height of a magnetic center of a rotor magnet. Magnetic action which attracts the rotor magnet downward is thereby produced between the rotor magnet and the stator.

Preferred embodiments of the present invention are applicable to bearing mechanisms of motors used for a variety of applications. Moreover, preferred embodiments of the present invention are also applicable to bearing mechanisms used in devices other than motors.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A bearing mechanism comprising:
a shaft portion centered on a central axis extending in a vertical direction, and including a cylindrical outer circumferential surface;
a sleeve portion including a sleeve body and an annular thrust plate, and arranged to be rotatable about the central axis relative to the shaft portion, the sleeve body including a through hole in which the shaft portion is accommodated, and the thrust plate being fixed to an end portion of the sleeve body on one of upper and lower sides; and
an opposing portion arranged to extend radially outward from an end portion of the shaft portion on the one of the upper and lower sides, and including a surface arranged axially opposite to an end surface of the sleeve portion on the one of the upper and lower sides with a thrust gap defined therebetween; wherein
the outer circumferential surface of the shaft portion and an inner circumferential surface of the sleeve portion are arranged to together define a radial gap therebetween, the radial gap including a radial dynamic pressure bearing portion defined therein;
the thrust gap includes a thrust dynamic pressure bearing portion defined therein;
a seal gap is continuously defined with an outer circumferential portion of the thrust gap, the seal gap including a seal portion defined therein;
the sleeve body includes:
an annular surface arranged to extend radially around the central axis, and arranged opposite to the thrust plate; and
an annular body projecting portion arranged to project in an axial direction inside of the annular surface;
an outer circumferential surface of the body projecting portion and an inner circumferential surface of the thrust plate are arranged to be in direct contact with each other or in indirect contact with each other with another member intervening therebetween;
the sleeve portion includes:
a first communicating channel including a mouth portion arranged to be open in the annular surface, and arranged to be in communication with an end portion of the radial gap on another one of the upper and lower sides; and
a second communicating channel defined between the sleeve body and the thrust plate, and arranged to define at least a portion of a channel extending from the mouth portion to the seal gap;
the mouth portion is arranged to axially overlap with the thrust dynamic pressure bearing portion;
a circulation channel including the thrust gap, the radial gap, the first communicating channel, and the second communicating channel is arranged to be in communication with the seal gap; and
the circulation channel and the seal gap are filled with a lubricating oil.

2. The bearing mechanism according to claim 1, wherein
a surface of the thrust plate which is opposed to the annular surface includes a height changing portion, a radially outer portion arranged radially outside the height changing portion, and a radially inner portion arranged radially inside the height changing portion;
the radially outer portion is arranged axially farther away from the annular surface than the radially inner portion;
at least a portion of the radially outer portion is arranged opposite to the mouth portion; and
the second communicating channel is defined between the sleeve body and the radially outer portion.

3. The bearing mechanism according to claim 2, wherein the radially inner portion is arranged to be in contact with the annular surface.

4. The bearing mechanism according to claim 2, wherein the height changing portion is arranged to extend over an entire circumferential extent of the thrust plate.

5. The bearing mechanism according to claim 2, wherein the height changing portion includes a height changing surface which is a slanting surface arranged between the radially inner portion and the radially outer portion.

6. The bearing mechanism according to claim 5, wherein the height changing surface is convex relative to the annular surface.

7. The bearing mechanism according to claim 5, wherein the height changing surface is concave relative to the annular surface.

8. The bearing mechanism according to claim 5, wherein the height changing surface includes different height portions defined by a plurality of shoulders.

9. The bearing mechanism according to claim 1, wherein
the sleeve body includes an annular body recessed portion that is recessed in the axial direction inside of the annular surface; and
the thrust plate includes a plate projecting portion arranged to project into the body recessed portion around an inner circumferential surface thereof.

10. A bearing mechanism comprising:
a shaft portion centered on a central axis extending in a vertical direction, and including a cylindrical outer circumferential surface;
a sleeve portion including a sleeve body and an annular thrust plate, and arranged to be rotatable about the central axis relative to the shaft portion, the sleeve body including a through hole in which the shaft portion is accommodated, and the thrust plate being fixed to an end portion of the sleeve body on one of upper and lower sides; and
an opposing portion arranged to extend radially outward from an end portion of the shaft portion on the one of the upper and lower sides, and including a surface arranged axially opposite to an end surface of the sleeve portion on the one of the upper and lower sides with a thrust gap defined therebetween; wherein the outer circumferential surface of the shaft portion and an inner circumferential surface of the sleeve portion are arranged to together define a radial gap therebetween, the radial gap including a radial dynamic pressure bearing portion defined therein;

the thrust gap includes a thrust dynamic pressure bearing portion defined therein;

a seal gap is continuously defined with an outer circumferential portion of the thrust gap, the seal gap including a seal portion defined therein;

the sleeve body includes:
- an annular surface arranged to extend radially around the central axis, and arranged opposite to the thrust plate;
- an annular body recessed portion that is recessed in an axial direction inside of the annular surface; and
- an annular body projecting portion arranged to project in the axial direction inside of the body recessed portion;

the thrust plate includes a plate projecting portion arranged to project into the body recessed portion around an inner circumferential surface thereof, the plate projecting portion being annular and having the body projecting portion arranged inside thereof;

an outer circumferential surface of the plate projecting portion and a side surface of the body recessed portion are arranged to be in direct contact with each other or in indirect contact with each other with another member intervening therebetween;

the sleeve portion includes:
- a first communicating channel including a mouth portion arranged to be open in the annular surface, and arranged to be in communication with an end portion of the radial gap on another one of the upper and lower sides; and
- a second communicating channel defined between the sleeve body and the thrust plate, and arranged to define at least a portion of a channel extending from the mouth portion to the seal gap;

the mouth portion is arranged to axially overlap with the thrust dynamic pressure bearing portion;

a circulation channel including the thrust gap, the radial gap, the first communicating channel, and the second communicating channel is arranged to be in communication with the seal gap; and the circulation channel and the seal gap are filled with a lubricating oil.

11. The bearing mechanism according to claim 1, wherein the thrust gap has an axial width smaller than an axial width of a gap defined between the body projecting portion and the opposing portion.

12. The bearing mechanism according to claim 11, wherein a difference between the axial width of the thrust gap and the axial width of the gap defined between the body projecting portion and the opposing portion is greater than a depth of a dynamic pressure groove of the thrust dynamic pressure bearing portion and smaller than an axial width of the second communicating channel.

13. The bearing mechanism according to claim 1, wherein the second communicating channel is arranged to be open radially outwardly in the sleeve portion.

14. The bearing mechanism according to claim 13, wherein an outer circumferential surface of the thrust plate is arranged radially inward of an outer circumferential surface of the sleeve body.

15. The bearing mechanism according to claim 1, further comprising an outer annular portion whose position relative to the opposing portion is fixed, and including a cylindrical or substantially cylindrical inner circumferential surface arranged to surround at least a portion of an outer circumferential surface of the sleeve portion, wherein a portion of the seal gap is defined between the outer circumferential surface of the sleeve portion and the inner circumferential surface of the outer annular portion.

16. The bearing mechanism according to claim 15, wherein, at the portion of the seal gap, a portion of the outer circumferential surface of the sleeve portion is a cylindrical surface centered on the central axis.

17. The bearing mechanism according to claim 1, wherein the inner circumferential surface of the thrust plate and the outer circumferential surface of the body projecting portion are adhered to each other through an adhesive.

18. The bearing mechanism according to claim 1, wherein the inner circumferential surface of the thrust plate and the outer circumferential surface of the body projecting portion are welded to each other.

19. A motor comprising:
the bearing mechanism of claim 1;
a stationary portion including a stator; and
a rotating portion including a rotor magnet, and supported by the bearing mechanism to be rotatable with respect to the stationary portion.

20. A disk drive apparatus comprising:
the motor of claim 19 arranged to rotate a disk;
an access portion arranged to perform at least one of reading and writing of information from or to the disk; and
a housing arranged to contain the disk, the motor, and the access portion.

* * * * *